United States Patent
Zhao et al.

(10) Patent No.: US 11,356,661 B2
(45) Date of Patent: *Jun. 7, 2022

(54) METHODS AND APPARATUS FOR MULTIPLE LINE INTRA PREDICTION IN VIDEO COMPRESSION

(71) Applicant: TENCENT AMERICA LLC, Palo Alto, CA (US)

(72) Inventors: Liang Zhao, San Diego, CA (US); Xin Zhao, Los Gatos, CA (US); Xiang Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,434

(22) Filed: Sep. 1, 2020

(65) Prior Publication Data

US 2020/0404261 A1    Dec. 24, 2020

Related U.S. Application Data

(63) Continuation of application No. 16/240,388, filed on Jan. 4, 2019, now Pat. No. 10,819,977, which is a continuation of application No. 16/234,324, filed on Dec. 27, 2018.

(60) Provisional application No. 62/694,132, filed on Jul. 5, 2018.

(51) Int. Cl.
*H04N 19/11*    (2014.01)
*H04N 19/159*   (2014.01)
*H04N 19/176*   (2014.01)
*H04N 19/174*   (2014.01)

(52) U.S. Cl.
CPC .......... *H04N 19/11* (2014.11); *H04N 19/174* (2014.11); *H04N 19/176* (2014.11)

(58) Field of Classification Search
None
See application file for complete search history.

(56) References Cited

U.S. PATENT DOCUMENTS

| 2017/0347093 | A1 | 11/2017 | Yu |
| 2017/0347103 | A1 | 11/2017 | Yu |
| 2019/0028702 | A1 | 1/2019  | Yu |

(Continued)

FOREIGN PATENT DOCUMENTS

WO    2018/070267 A1    4/2018

OTHER PUBLICATIONS

International Search Report dated Aug. 19, 2019 issued by the International Searching Authority in International Application No. PCT/US2019/039593.

(Continued)

*Primary Examiner* — Samuel D Fereja
(74) *Attorney, Agent, or Firm* — Sughrue Mion, PLLC

(57) ABSTRACT

There is includes a method and apparatus comprising computer code configured to cause a hardware processor or processors to perform intra prediction among a plurality of reference lines, to set a plurality of intra prediction modes for a zero reference line nearest to a current block of the intra prediction among non-zero reference lines, and to set one or more most probable modes for one of the non-zero reference lines.

20 Claims, 26 Drawing Sheets

(56) References Cited

U.S. PATENT DOCUMENTS

2019/0082194 A1* 3/2019 Chang .................. H04N 19/182
2019/0238835 A1 8/2019 Lee

OTHER PUBLICATIONS

Written Opinion dated Aug. 19, 2019 issued by the International Searching Authority in International Application No. PCT/US2019/039593.
Office Action dated Nov. 2, 2021 in Japanese Application No. 2020-560446.
Bross et al., "CE3: Multiple reference line intra prediction (Test 5.4.1, 5.4.2, 5.4.3 and 5.4.4)", Joint Video Experts Team (JVET) of ITU-T SG 16 WP 3 and ISO/IEC JTC 1/SC 29/WG 11, Document: JVET-K0051-v1, 11th Meeting: Ljubljana, SI, Jul. 10-18, 2018 (8 pages total).
Notification of Reason for Refusal dated Feb. 24, 2022 from the Korean Patent Office in Korean Application No. 10-2020-7027442.
Liang Zhao et al., "CE3-related: MPM based multi-line intra prediction scheme", Joint Video Exploration Team (JVET) of ITU-T SG 16 WP 3 and ISO/IEC JTC 1/SC 29/WG 11, Document: JVET-K0482_r1, 2018 (3 pages total).
Extended European Search Report dated Feb. 28, 2022 in European Application No. 19831399.1.
Hui-Yu Jiang et al., "CE3-related: Advanced MPM based on intra reference line selection scheme", Joint Video Experts Team (JVET) of ITU-T SG 16 WP 3 and ISO/IEC JTC 1/SC 29/WG 11, Document: JVET-K0175-v1, 2018, p. 3, Retrieved from: URL: <http://phenix.int-evry.fr/jvet/doc_end_user/documents/11_Ljubljana/wg11/JVET-K0175-v1> (3 pages total).
Yao-Jen Chang et al., "Improved Intra Prediction Method Based on Arbitrary Reference Tier Coding Schemes", IEEE, 2016, pp. 1-5 (5 pages total).

* cited by examiner

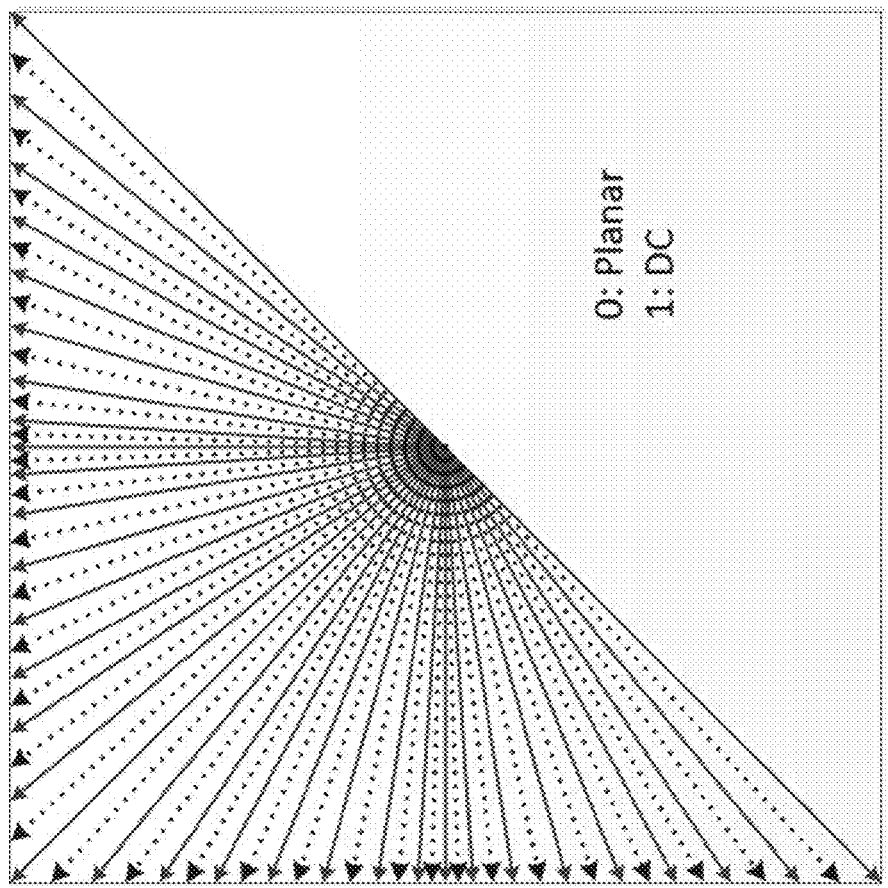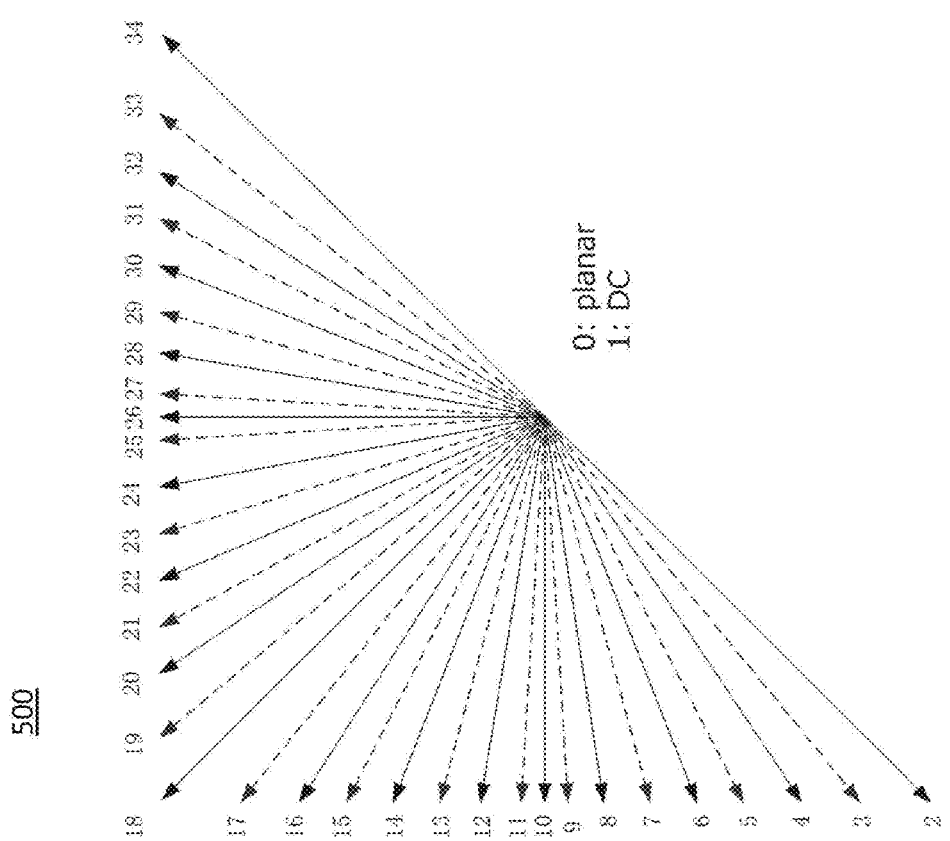
FIG. 5

2400

METHODS AND APPARATUS FOR MULTIPLE LINE INTRA PREDICTION IN VIDEO COMPRESSION

CROSS REFERENCE TO RELATED APPLICATION

The present application is a Continuation of Nonprovisional U.S. application Ser. No. 16/240,388 filed on Jan. 4, 2019, which claims priority to Continuation of Nonprovisional U.S. application Ser. No. 16/234,324 filed on Dec. 27, 2018, which claims priority to Provisional Application U.S. 62/694,132, filed on Jul. 5, 2018. Each of the above application(s) is hereby expressly incorporated by reference, in its entirety, into the present application.

BACKGROUND

1. Field

The present disclosure is directed to next-generation video coding technologies beyond HEVC, and more specifically, to improvements to intra prediction scheme using multiple reference lines, for example.

2. Description of Related Art

The video coding standard HEVC (High Efficiency Video Coding) main profile was finalized in 2013. Soon after that the international standard organizations, ITU-T VCEG (Q6/16) and ISO/IEC MPEG (JTC 1/SC 29/WG 11), started exploring the needs for developing a future video coding standard with the potential to significantly enhance the compression capability compared with the current HEVC standard (including its current extensions). The groups are working together on this exploration activity in a joint collaboration effort known as the Joint Video Exploration Team (JVET) to evaluate compression technology designs proposed by their experts in this area. A Joint Exploration Model (JEM) has been developed by JVET to explore the video coding technologies beyond the capability of HEVC, and current latest version of JEM is JEM-7.1.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology with a compression capability that significantly exceeds that of the HEVC standard (including its extensions). In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team-Joint Video Expert Team) meeting. With careful evaluation, JVET formally launched the standardization of next-generation video coding beyond HEVC, i.e., the so-called Versatile Video Coding (VVC). The current version of VTM (VVC Test Model), i.e., VTM 1.

Even if multiple lines are available, there are various technical problems in the art. For example, there is a technical problem in which it is found that a first reference line is still the most selected line. However, each block with first reference line always needs to signal one bin to indicate the line index of the current block.

Further, multiple line intra prediction is only applied to luma intra prediction. The potential coding gain of multiple line intra prediction with chroma component is not exploited.

Further, reference samples with different line indexes may have different characteristics by which it is not optimal to set the same number of intra prediction modes for different reference lines.

Further, for multiple line intra prediction, the pixels of multiple neighboring lines have been stored and accessed; however, pixels in the neighboring lines are not exploited to smooth the pixels in the current line.

Further, for multiple line intra prediction, the encoder selects one reference line to predict the pixel values in the current block; however, the variation trend of the neighboring pixels is not exploited to predict the samples in the current block.

Further, for multiple line intra prediction, there is no planar or DC mode for number >1. The exploration of the other versions of DC or planar mode are not fully exploited.

Further, multiple line reference pixels are applied to intra prediction; however, there are also other places where they use reference pixels, but the coding gain of multiple line reference pixels are not exploited.

Therefore, there is a desire for a technical solution to such problems.

SUMMARY

There is included a method and apparatus comprising memory configured to store computer program code and a hardware processor or processors configured to access the computer program code and operate as instructed by the computer program code. The computer program includes intra prediction code, configured to cause the processor to code or decode a video sequence by performing intra prediction among a plurality of reference lines of the video sequence, intra prediction mode code, configured to cause the processor to set intra prediction modes for a first reference line, a zero reference line, nearest to a current block of the intra prediction among a plurality of non-zero reference lines, and most probable mode code configured to cause the processor to set one or more most probable modes for a second reference line, on of the non-zero reference lines.

According to exemplary embodiments, the program code further includes signaling code configured to cause the processor to signal a reference line index before signaling a most probable mode flag and an intra mode, to signal, in response to determining that the reference line index is signaled and that a signaled index indicates the zero reference line, the most probable mode flag, and, in response to determining that the reference line index is signaled and that a signaled index indicates at least one of the non-zero reference lines, derive the most probable mode flag to be true, without signaling the most probable mode flag, and signal a most probable mode index of the current block.

According to exemplary embodiments, the most probable mode code is further configured to cause the processor to include the one or more most probable modes in a most probable mode list and to exclude a planar mode and a DC mode from the most probable modes list.

According to exemplary embodiments, the most probable mode code is further configured to cause the processor to set a length of the most probable mode list based on a reference line index value such that the length of the most probable mode list comprises a number of the one or more most probable modes.

According to exemplary embodiments, the most probable mode code is further configured to cause the processor to set, in response to detecting the non-zero reference line, the length of the most probable mode list either to 1 or to 4 and to set, in response to determining that a current reference line is a zero reference line, the length of the most probable mode list to 3 or 6.

According to exemplary embodiments, the most probable mode code is further configured to cause the processor to set, in response to detecting the non zero reference line, the length of the most probable mode list to consist of five most probable modes.

According to exemplary embodiments, wherein one of the non-zero reference lines is a neighboring line to the current block and is further away from the current block than the zero reference line.

According to exemplary embodiments, the one or more most probable modes comprise any level of most probable mode from a lowest level most probable mode to a highest level most probable mode.

According to exemplary embodiments, the one or more most probable modes comprise only levels of the most probable modes allowed for the non-zero reference line.

BRIEF DESCRIPTION OF THE DRAWINGS

Further features, nature, and various advantages of the disclosed subject matter will be more apparent from the following detailed description and the accompanying drawings in which:

FIGS. 1-8 are schematic illustrations of diagrams in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium. In the present disclosure, most probable mode (MPM) can refer to a primary MPM, a secondary MPM, or both a primary and a secondary MPM.

Figure 1:
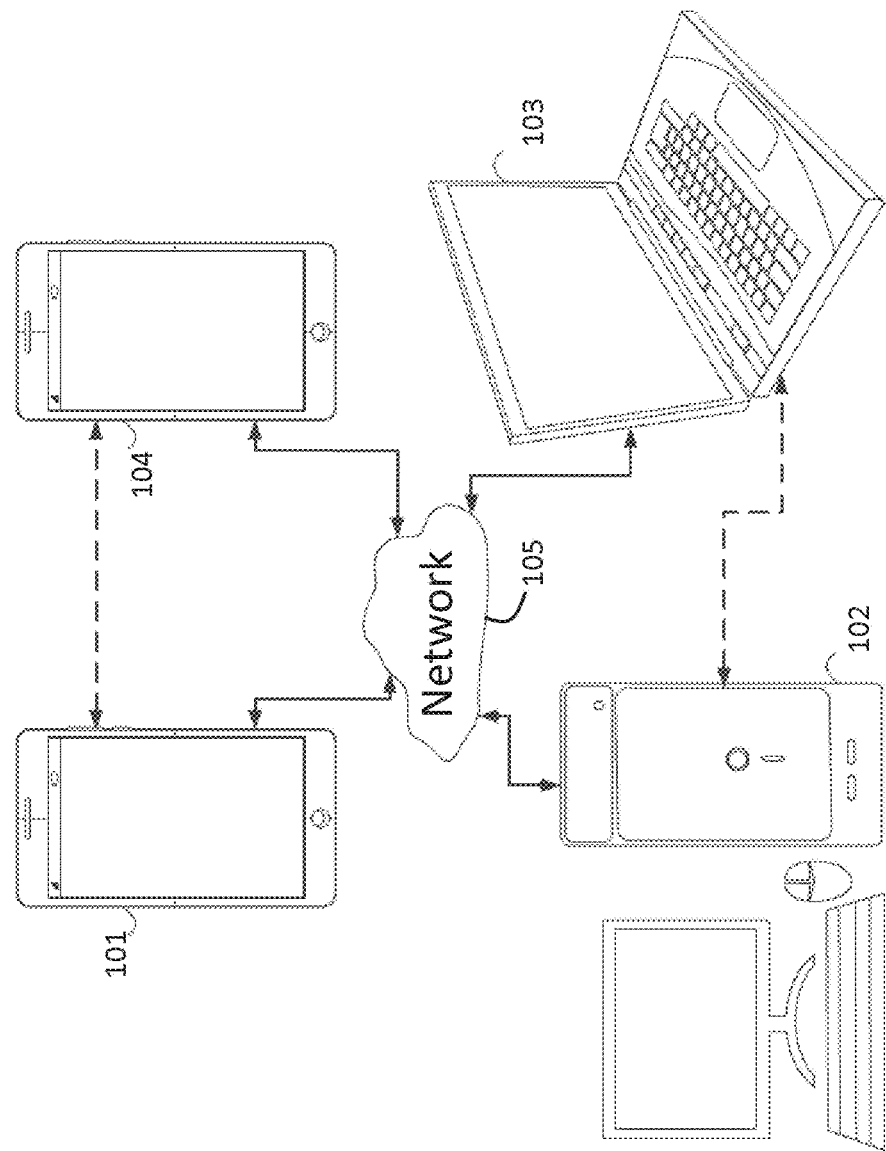

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
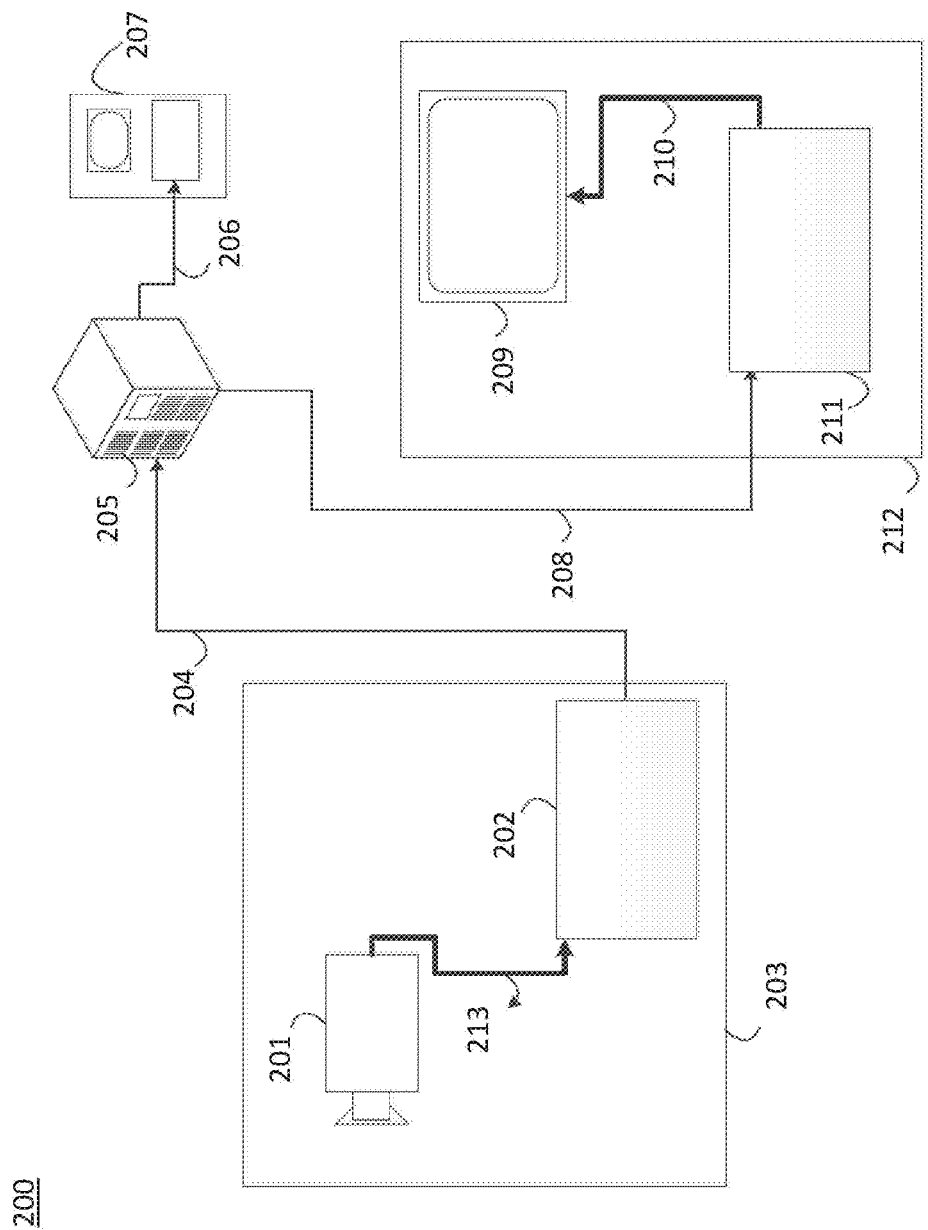

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213, depicted as a bold line to emphasize a high data volume when compared to encoded video bitstreams, can be processed by an encoder 202 coupled to the camera 201. The encoder 202 can include hardware, software, or a combination thereof to enable or implement aspects of the disclosed subject matter as described in more detail below. The encoded video bitstream 204, depicted as a thin line to emphasize the lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
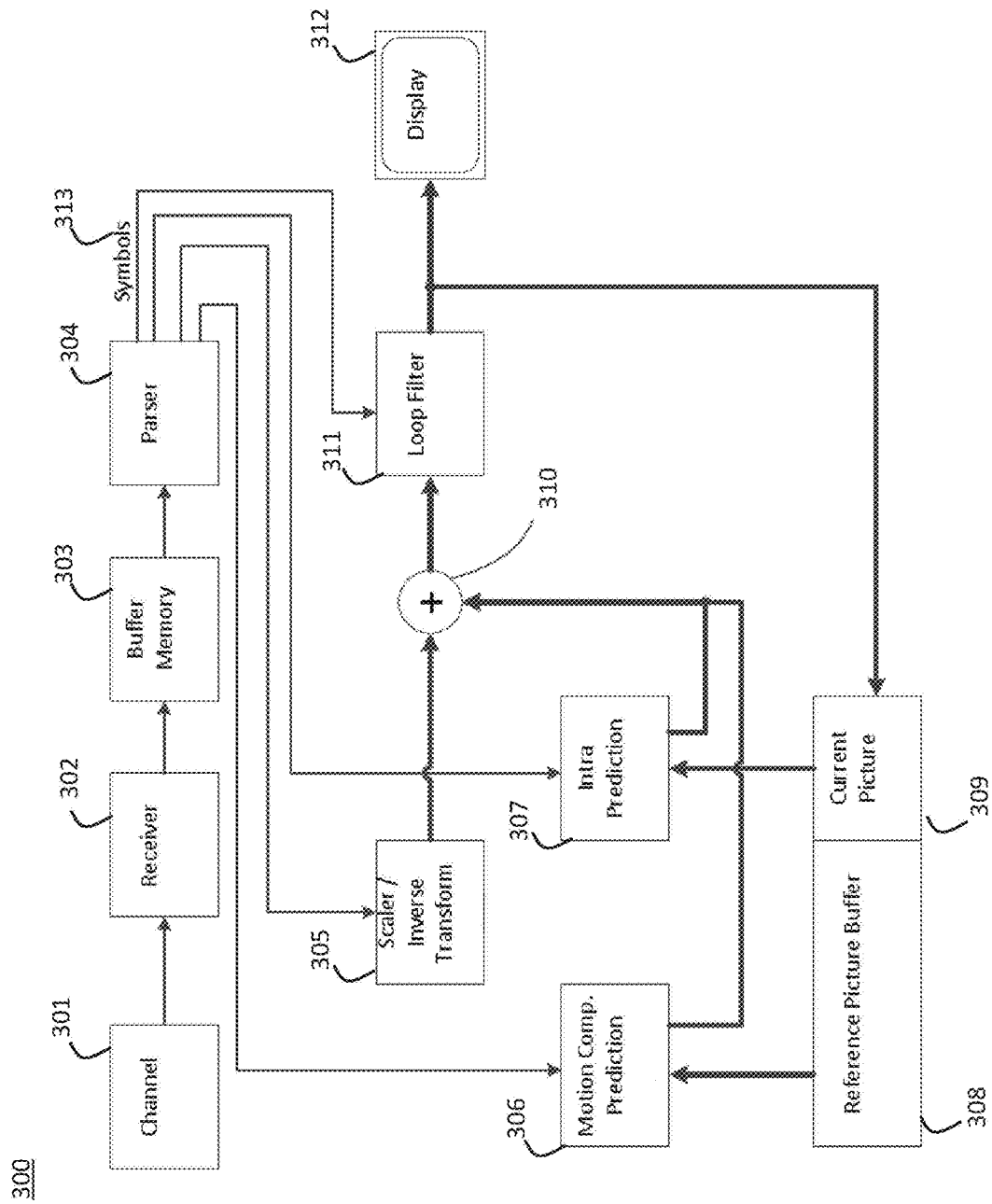

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 200 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
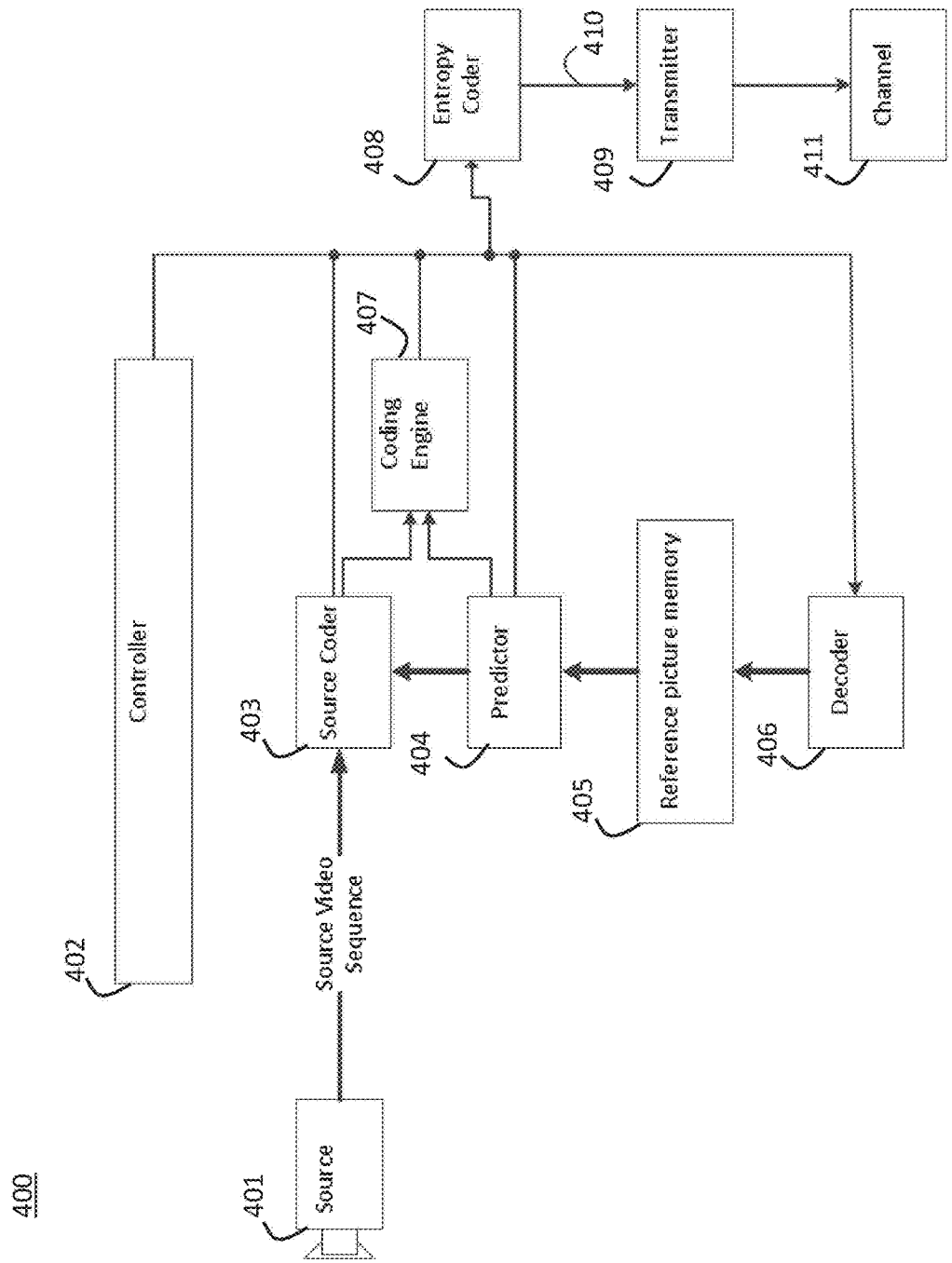

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The video coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1, and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an MPM list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
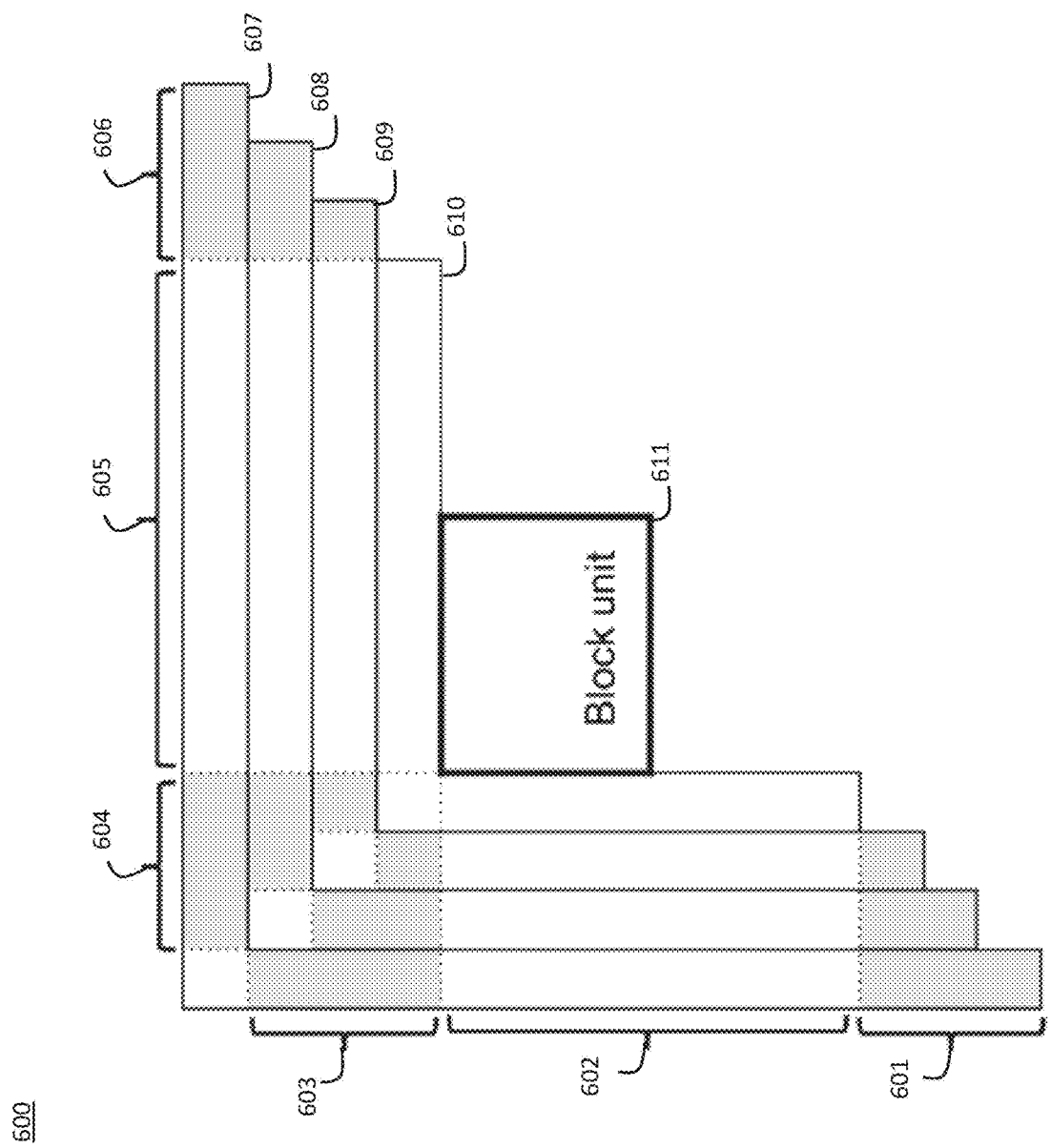

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 209, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y)

is generated from one of the reference samples S1, S2, ..., and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$\text{pred}[x][y]=(wL*R_{-1,y}+wT*R_{x,-1}+wTL*R_{-1,-1}+ (64-wL-wT-wTL)*\text{pred}[x][y]+32)>>6 \quad \text{(Eq. 2-1)}$$

where $R_{x,-1}$, $R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 2-2)}$$

$$wL=32>>((x<<1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5)}.$$

Figure 7:
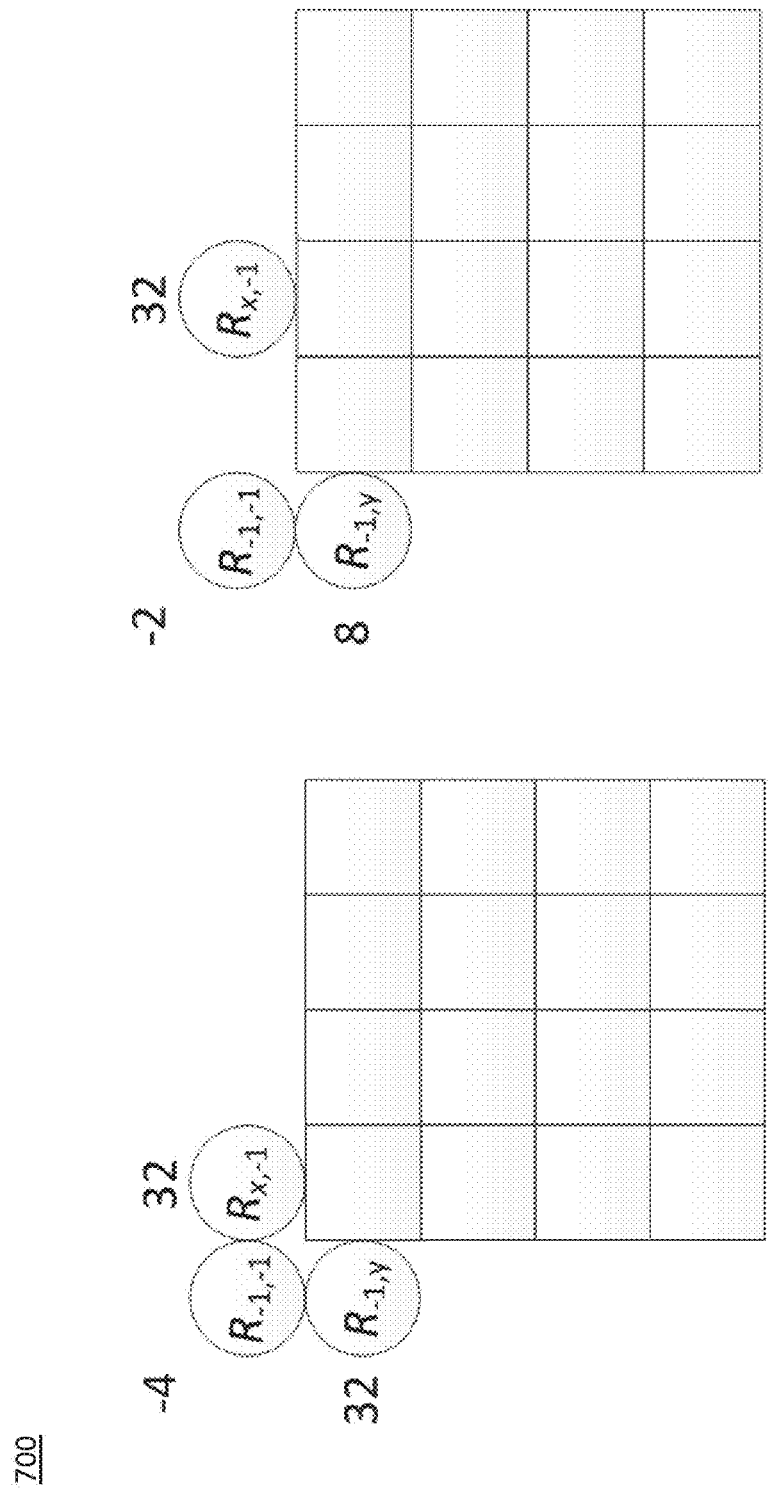

FIG. 7 illustrates a diagram 700 in which weightings (wL, wT, wTL) for (0, 0) and (1, 0) positions inside one 4×4 block are shown.

Figure 8:
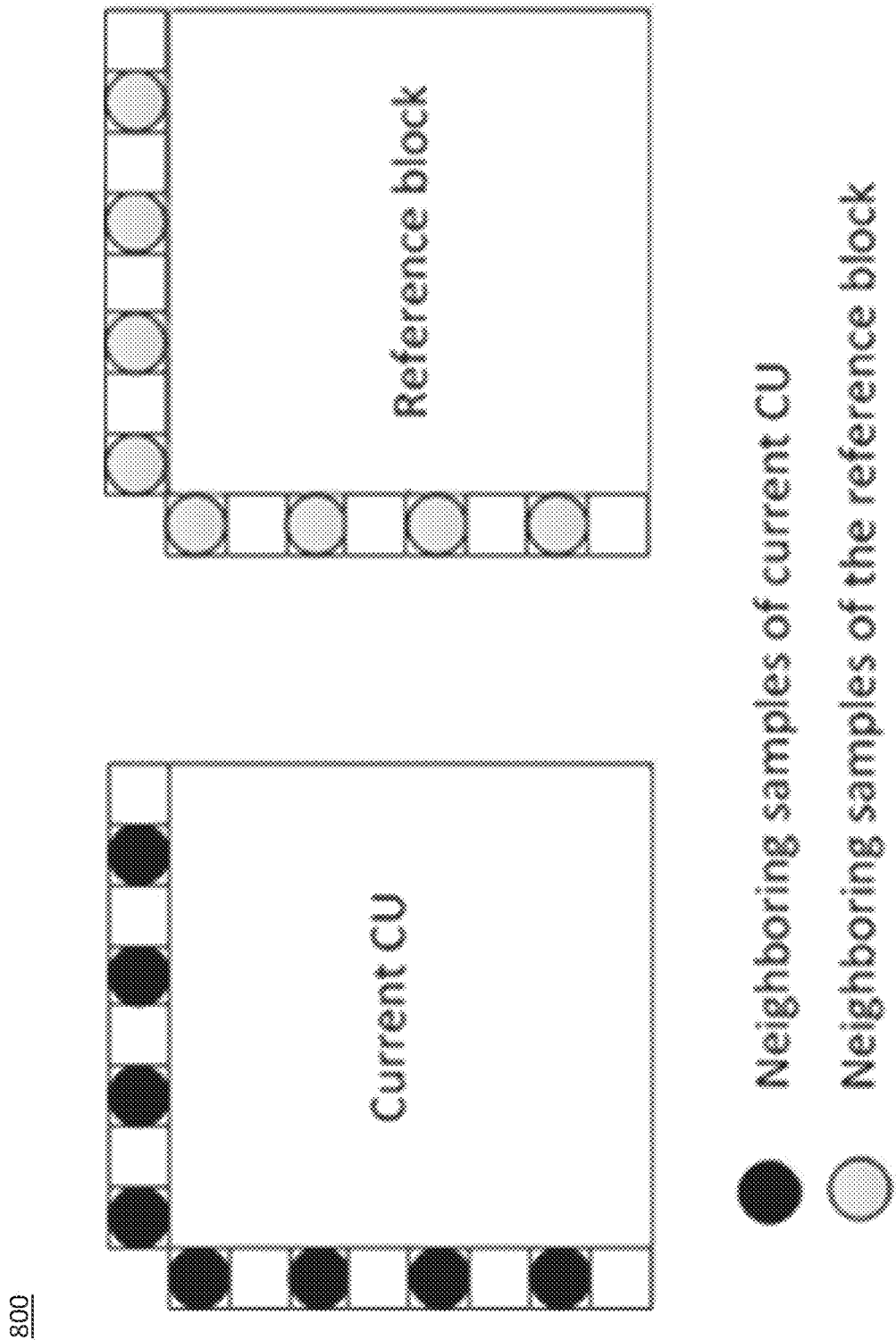

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9:
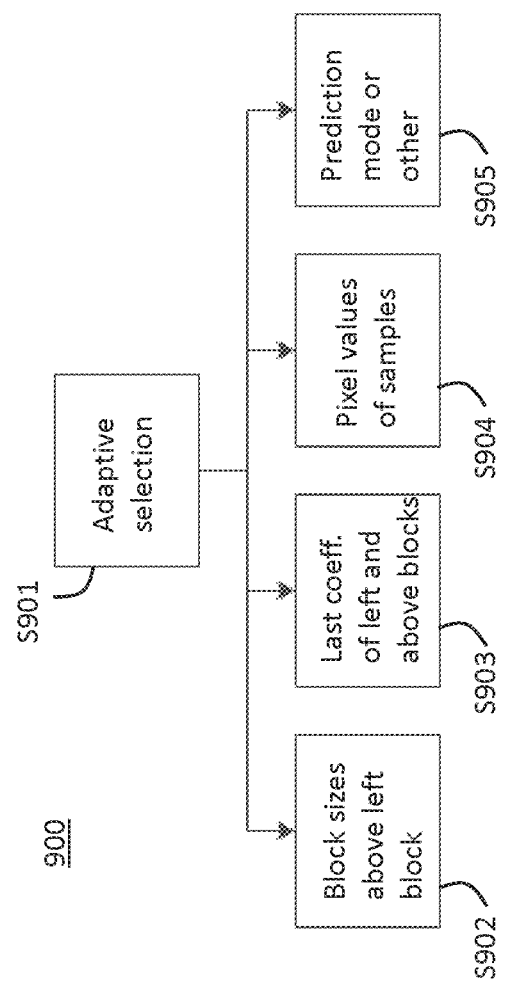
FIGS. 9-14 are simplified flow charts in accordance with embodiments.

FIG. 9 illustrates a flowchart 900 according to exemplary embodiments.

At S901, for multiple line intra prediction, instead of setting a same number of reference tiers for all blocks, the number of reference tiers for each block may be adaptively selected. Here, the index of the closest reference line is denoted as 1.

At S902, the block sizes of above/left block can be used to determine the number of reference tiers of current block. For example, if the sizes of above and/or left blocks are larger than M×N, the number of reference tiers for current block is restricted to L. M and N can be 4, 8, 16, 32, 64, 128, 256 and 512. L can be 1~8.

In one embodiment, when M and/or N is equal to or larger than 64, L is set to 1.

In another embodiment, a ratio of a number of above candidate reference rows to a number of left candidate reference columns is the same as the ratio of block width to block height. For example, if the current block size is M×N, the number of candidates above reference rows is m and the number of candidates left reference columns is n, then M:N=m:n.

Alternatively, at S903, the position of last coefficients of left and above blocks can be used to determine a number of reference tiers for current block. For example, if a position of last coefficient is within a first M×N region for above and/or left blocks, the number of reference tiers for current block is restricted to L, (e.g. L can be 1~8), M and N can be 1~1024.

In one embodiment, when there is no coefficients in above and/or left blocks, the number of reference tiers for current block is restricted to 1.

In another embodiment, when the coefficients in the above and/or left blocks are within 2×2 top-left region, the number of reference tiers for current block is restricted to 1~2.

Alternatively, at S904, the pixel values of reference samples in above and/or left blocks can be used to determine the number of reference tiers of current block. For example, if the difference between reference line with index $L_i$ and the reference line with index $L_j$ ($L_i < L_j$) is quite small, the reference line $L_j$ will be removed from the reference line list. $L_i$ and $L_j$ can be 1~8. In some cases, reference lines with number >1 are all removed, because the difference between all the reference lines are quite small. The method to measure the difference between two reference lines includes, but not limited to, gradient, SATD, SAD, MSE, SNR and PSNR.

In one embodiment, if the average SAD of $L_i$ and $L_j$ is less than 2, the reference line $L_j$ is removed from the reference line list.

Alternatively, at S905, the prediction mode of above and/or left mode information can be used to determine the number of reference tiers for a current block.

In one embodiment, if the prediction mode of above and/or left blocks is a skip mode, the number of reference tiers for a current block is restricted to L. L can be 1~8.

Figure 10:
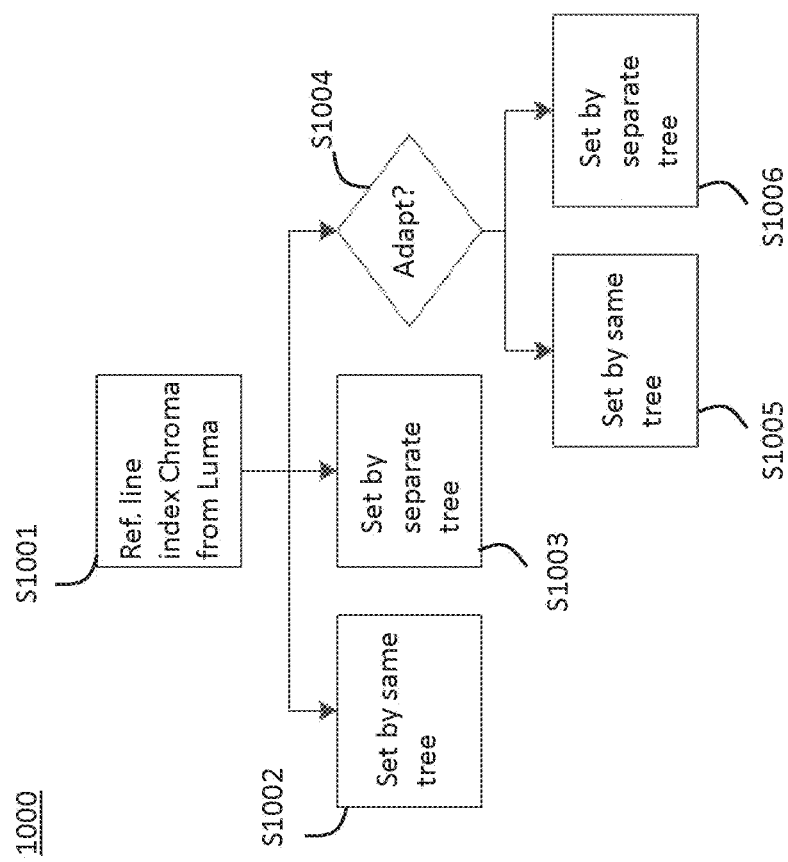

FIG. 10 illustrates a flowchart 1000 according to exemplary embodiments.

At S1001, the reference line index of Chroma can be derived from Luma, both for separated tree or the same tree. Here, the index of the closest reference line is denoted as 1.

At S1002, for the same tree, if the reference line index for the co-located luma block is ≥3, the reference line index of current Chroma block is set to 2. Otherwise, the reference line index of current Chroma block is set to 1.

At S1003, for the separated tree, if the chroma block just covers one block in luma component, the reference line index derivation algorithm is the same as 2.a. If the chroma block covers multiple blocks in luma component, the reference line index derivation algorithm can be one of the following:

For the co-located blocks in a luma component, if the reference line index of majority of the blocks are less than 3, the reference line index for a current chroma block is derived as 1. Otherwise, the reference line index for the current chroma block is derived as 2. The method to measure majority can include, but not limited to the region size of the blocks and the number of the blocks.

Or, for the co-located blocks in luma component, if the reference line index of one block is equal to or larger than 3, the reference line index for current chroma block is derived as 2. Otherwise, the reference line index for current chroma block is derived as 1.

alternatively, for the co-located blocks in a luma component, if the reference line index of majority of the blocks are less than 3, the reference line index for a current chroma block is derived as 1. Otherwise, the reference line index for the current chroma block is derived as 2.

Alternatively, at S1004, it is considered whether to use an adaptive selection, and if so, the methods in FIG. 9 can also be used to restrict the number of reference tiers for a current chroma block. After applying methods of FIG. 9, the number of reference tiers is set $L_{C1}$. Then, the derivation algorithm in S1002 and S1003, or illustrated as S1005 and S1006 in FIG. 10, is also applied to obtain the line index for a current block $L_{C2}$. Then, min ($L_{C1}$, $L_{C2}$) is the final reference line index for a current Chroma block.

Figure 11:
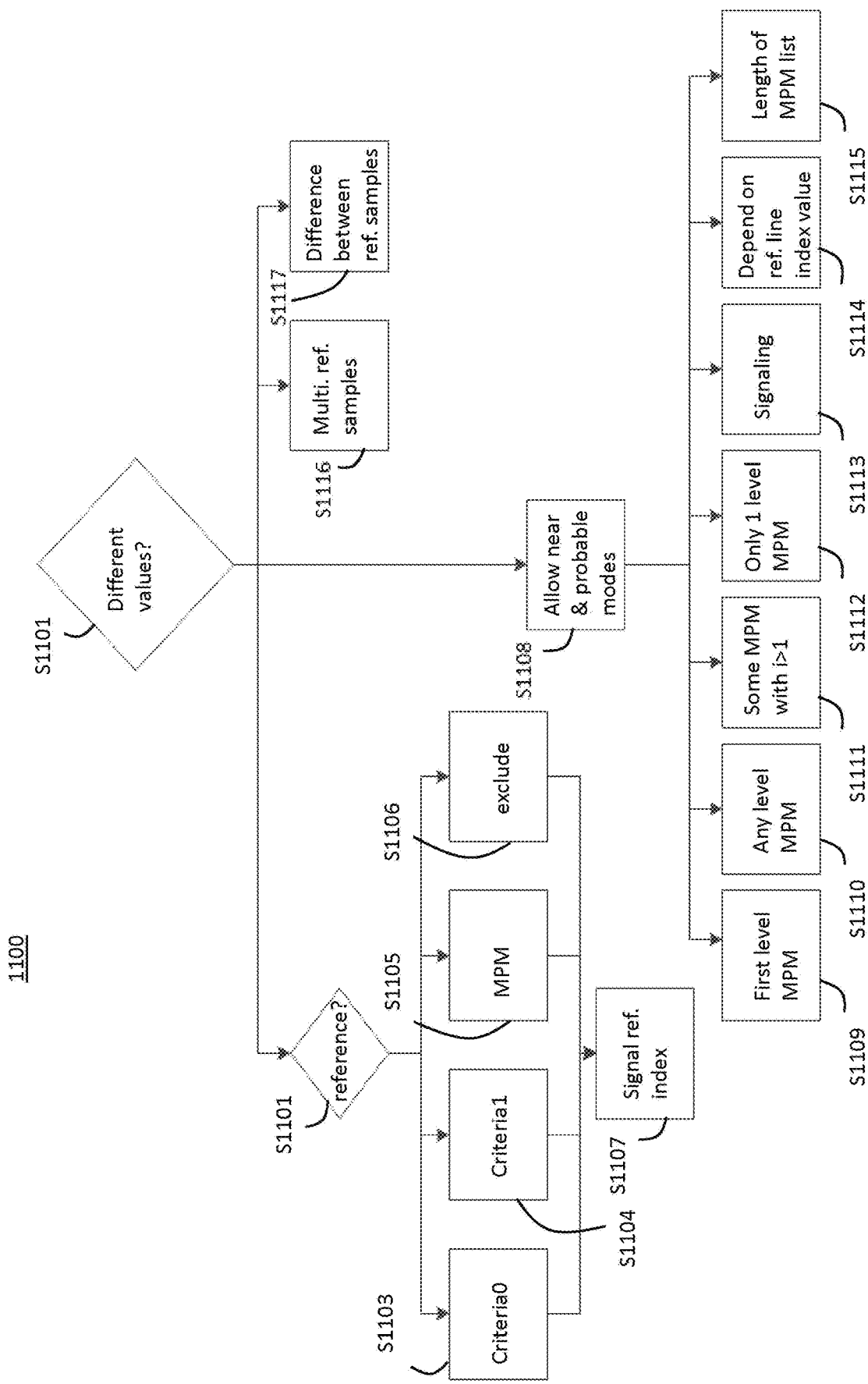

FIG. 11 illustrates a flowchart 1100 according to an exemplary embodiment.

At S1101, it is considered that a different reference line has a different number of intra prediction modes. Here, the index of the closest reference line is denoted as 1.

For example, $1^{st}$ reference line has 67 modes, $2^{nd}$ reference line has 35 modes, $3^{rd}$ reference line has 17 modes, $4^{th}$ reference line has 9 modes For example, $1^{st}$ reference line has 67 modes, $2^{nd}$ reference line has 33 modes, $3^{rd}$ reference line has 17 modes, $4^{th}$ reference line has 9 modes.

Alternatively, at S1102, reference lines with index >1 share the same intra mode number, but much less than that of $1^{st}$ line, such as equal to or less than the half of the intra prediction modes of the $1^{st}$ reference line.

At S1103, for example, only directional intra prediction modes with even mode index are allowed for reference line with index larger than 1. As illustrated in FIG. 5, directional intra prediction modes with odd mode index are marked with a dotted arrow while directional intra prediction modes with even mode index are marked with a solid arrow.

At S1104, in another example, only directional intra prediction modes with an even mode index and DC and Planar modes are allowed for a reference line with an index larger than 1.

At S1105, in another example, only most probable modes (MPM) are allowed for nonzero reference lines, including both the first level MPM and the second level MPM.

At S1106, in another example, since a reference line index larger than 1 is only enabled for even (or odd mode) intra prediction modes, when coding the intra prediction modes, if a reference line index larger than 1 is signaled, the intra prediction modes, e.g., Planar/DC, and odd (or even) intra prediction modes are excluded from the MPM derivation and list, excluded from second level MPM derivation and list, and excluded from the remaining non-MPM mode list.

At S1107, the reference line index is signaled after signaling of the intra prediction modes, and whether to signal the reference line index is dependent on the signaled intra prediction mode.

For example, only directional intra prediction modes with an even mode index are allowed for a reference line with index larger than 1. If the signaled intra prediction mode is a directional prediction with an even mode index, the selected reference line index is signaled. Otherwise, only one default reference line, e.g., the nearest reference line, is allowed for intra prediction and no index is signaled.

In another example, only most probable modes (MPM) are allowed for reference lines with index larger than 1. If the signaled intra predictions are from MPMs, the selected reference line index needs to be signaled. Otherwise, only one default reference line, e.g., the nearest reference line is allowed for intra prediction and no index is signaled.

In another sub-embodiment, reference lines with an index larger than 1 are still enabled for all directional intra prediction modes, or all intra prediction modes, and the intra prediction mode index can be used as the context for entropy coding the reference line index.

In another embodiment, only most probable modes (MPMs) are allowed for reference lines with index larger than 1. In one approach, all MPMs are allowed for reference lines with indices greater than 1. In another approach, a subset of MPMs are allowed for multiple reference lines with index greater than 1. When MPMs are categorized in multiple levels, in one approach, only some levels of MPMs are allowed for reference lines with indices greater than 1. In one example, only the lowest level MPMs are allowed for reference lines with indices greater than 1. In another example, only the highest level MPMs are allowed for reference lines with indices greater than 1. In another example, only the pre-defined (or signaled/indicated) level MPMs are allowed for reference lines with indices greater than 1.

In another embodiment, only non-MPMs are allowed for reference lines with indices larger than 1. In one approach, all non-MPMs are allowed for reference lines with indices greater than 1. In another approach, a subset of non-MPMs are allowed for multiple reference lines with indices greater than 1. In one example, only the non-MPM associated with an even (or odd) index in descending (or ascending) order of all non-MPM intra mode index are allowed for reference lines with indices greater than 1.

In another embodiment, Planar and DC modes are assigned with a pre-defined index of MPM mode list.

In one example, the pre-defined index further depends on coded information, including but not limited to, block width and height.

In another sub-embodiment, MPMs with given indices are allowed for reference lines with indices larger than 1. The given MPM indices can be signaled or specified in as a high level syntax element, such as in sequence parameter set (SPS), picture parameter set (PPS), slice header, or as a common syntax element or parameter for a region of a picture. Only when intra mode of current block equals to one of the given MPM indices, reference line index is signaled.

For example, the length of MPM list is 6, and the index of MPM list is 0, 1, 2, 3, 4, and 5. If intra mode of current block is not equal to the mode with MPM index 0 and 5, reference lines with index larger than 1 is allowed.

At S1108, in one embodiment, all intra prediction modes are allowed for the nearest reference line of current block whereas only the most probable modes are allowed (or disallowed) for a reference line with index larger than 1 (or specific index value, e.g., 1).

At S1109, in one embodiment, a most probable mode only includes the first level MPM, such as, 3 MPM in HEVC, 6 MPM in JEM (or VTM).

At S1110, in another embodiment, most probable modes can be any level of MPM from the lowest level MPMs to the highest level MPMs.

At S1111, in another embodiment, only some levels of MPMs are allowed for reference lines with indices greater than 1.

At S1112, in another embodiment, most probable modes can be only one level of MPM, such as the lowest level MPMs, the highest level MPMs or the predefined level MPMs.

At S1113, in another embodiment, a reference line index is signaled before an MPM flag and an intra mode. When a signaled reference line index is 1, an MPM flag is also signaled. When a signaled reference line index is larger than 1, a MPM flag of a current block is not signaled and a MPM flag of current block is derived as 1. The MPM index of a current block is still signaled for a reference line with index larger than 1.

At S1114, in one embodiment, the MPM list generation process depends on a reference line index value.

In one example, the MPM list generation process, for a reference line with an index larger than 1, is different than for a reference line with an index equal to 1. For a reference line with an index larger than 1, planar and DC mode is excluded from the MPM list. The length of the MPM list is the same for all reference lines.

The default MPMs used in the MPM list generation process are dependent on a reference line index. In one example, the default MPMs, associated with a reference line with an index larger than 1, are different than for those associated with a reference line with an index equal to 1.

At S1115, in one embodiment, the length of MPM list, i.e., a number of MPMs, depends on a reference line index value.

In another embodiment, the length of MPM list for a reference line index value at 1 is set differently and for a reference line index value larger than 1. For example, a length of an MPM list for a reference line with an index larger than 1 is 1, or 2 shorter than a length of an MPM list for a reference line index of 1.

In another embodiment, the length of the MPM list, i.e., number of MPMs, for a reference line index larger than one, is 5. The default MPMs for an MPM list generation process is {VER, HOR, 2, 66, 34} when 65 angular modes are applied. The order of the default MPM can be any combination of these 5 listed modes.

At S1116, for angular intra prediction modes which have derived (not signaled) a reference line index, e.g., odd directional intra prediction modes, and/or Planar/DC, multiline reference samples are used to generate the predictors for a current block.

For angular intra prediction modes which have derived (not signaled) a reference line index, the prediction sample value is generated using a weighted sum of multiple predictors, wherein each of the multiple predictors are the prediction generated using one of the multiple reference lines.

In one example, the weighted sum is using {3, 1} weightings applied on the predictors generated by the first reference line and the second reference line, respectively.

In another example, the weightings depend on the block size, the block width, the block height, the sample position within the current block to be predicted, and/or an intra prediction mode.

In one example, for a given angular prediction mode with an odd index, $1^{th}$ reference line is used to generate one prediction block unit $Pred_1$ and a $2^{nd}$ reference line is used to generate another prediction block unit. Then, the final prediction value for each pixel in current block unit is the weighted sum of these two generated prediction block units. This process can be formulated by the Eq. (4-1), where $W_i$ is the same value for all the pixels in the same block. For different blocks, $W_i$ can be the same regardless of intra prediction modes and block sizes or can be dependent on the intra prediction modes and blocks sizes.

$$\text{Pred}'(x,y)=\Sigma_{i=1}^{2} W_i \text{Pred}_i(x,y), \qquad \text{(Eq. 4-1)}$$

Alternatively, at S1117, the number of intra prediction modes for each reference line is derived by the difference between the reference samples in that line. The method to measure the difference include, but not limited to gradient, SATD, SAD, MSE, SNR and PSNR.

If both the above row and left column of the reference samples are quite similar, the number of modes can reduced to 4, 9, 17 or 35 modes. The 4 modes are: planar, DC, vertical, and horizontal modes.

If only an above row of the reference samples are quite similar, the modes in vertical-like prediction modes are down-sampled. In special cases, only mode 50 is kept, and modes 35~mode 49 and mode 51~mode 66 are excluded. In order to make the total intra prediction modes as 9, 17 or 35, the intra prediction modes in horizontal-like direction are reduced accordingly.

Else if only left column of the reference samples are quite similar, the modes in horizontal-like direction are down-sampled. In special cases, only mode 18 is kept, and modes 2~mode 17 and mode 19~mode 33 are excluded. In order to make the total intra prediction modes as 9, 17 or 35, the intra prediction modes in vertical-like direction is reduced accordingly.

Figure 12:
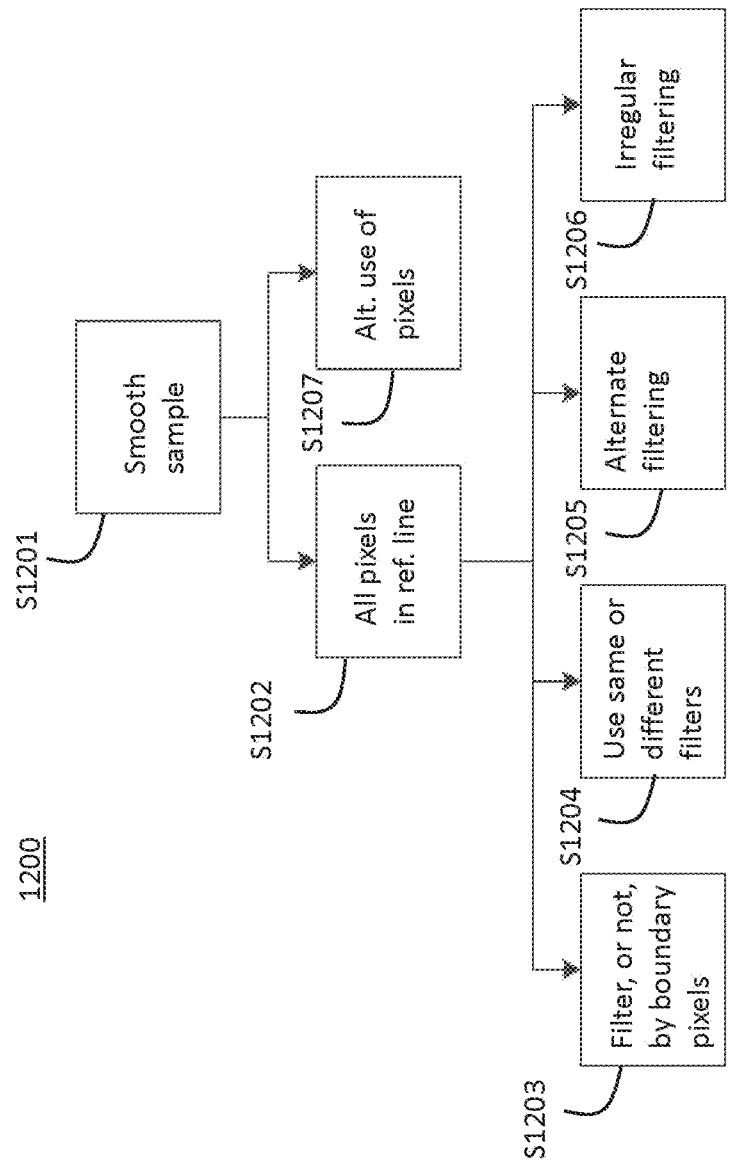

FIG. 12 illustrates a flowchart 1200 according to exemplary embodiments.

At S1201, there is smoothing of each sample in a current reference line based on the neighboring samples in a current line and its neighboring reference line(s). Here, the index of the closest reference line is denoted as 1.

At S1202, for each pixel in a current line, all pixels in a reference line 1~L can be used to smooth the pixels in current line. L is the max allowed reference line number for intra prediction, and L can be 1~8.

At S1203, for the boundary pixels, they can be filtered or not filtered. If they are filtered, each boundary pixel in the same line uses the same filter. Boundary pixels in the different lines can use different filters. For example, the boundary pixels in a $1^{st}$ reference line can be filtered by a [3,2,2,1] filter, the boundary pixels in a $2^{nd}$ reference line can be filtered by a [2,3,2,1] filter, the boundary pixels in a $3^{rd}$ reference line can be filtered by a [1,2,3,2] filter, and the boundary pixels in a $4^{th}$ reference line can be filtered by a [1,2,2,3] filter.

At S1204, for the other pixels, the pixels in each line can use the same filter, and the pixels in different lines can use different filters. Alternatively, for the other pixels, the pixels in different position can use different filters. But these filters are pre-defined, and the encoder does not need to signal the index of the filter.

At S1205, alternatively, the filtering operation for each line can be an intra prediction mode and transform size dependent. The filtering operation is enabled only when the intra prediction mode and the transform size satisfies a certain condition. For example, the filtering operation is disabled when the transform size is equal to 4×4 or smaller.

At S1206, alternatively, rather than a rectangular shape, the filter used to smooth each pixel may have an irregular filter support shape. The filter support shape may be predefined and may depend on any information available to both the encoder and the decoder, including but not limited to: a reference line index, an intra mode, a block height and/or a width.

Alternatively, at S1207, for each pixel in a $1^{st}$ reference line, the pixels in a $1^{st}$ reference line and a $2^{nd}$ reference line can be used to smooth that pixel. For each pixel in a $2^{nd}$ reference line, the pixels in a $1^{st}$ reference line, a $2^{nd}$ reference line, and a $3^{rd}$ reference line can be used to smooth that pixel. For each pixel in a $3^{rd}$ reference line, the pixels in a $2^{nd}$ reference line, a $3^{rd}$ reference line, and a $4^{th}$ reference line can be used to smooth that pixel. For each pixel in a $4^{th}$ reference line, the pixels in a $3^{rd}$ reference line and a $4^{th}$ reference line can be used to smooth that pixel. In other words, for pixels in a $1^{st}$ reference line and a $4^{th}$ reference line, the pixels in two lines are used to filter each pixel, and for pixels in a $2^{nd}$ reference line and a $3^{rd}$ reference line, pixels in three lines are used to filter each pixel.

For example, the filtered pixels in a $2^{nd}$ reference line and a $3^{rd}$ reference line can be computed from Eq. 4-2~Eq. 4-5.

$$p'(x,y)=(p(x-1,y)+p(x,y-1)+p(x,y+1)+p(x+1,y)+4*p(x,y))>>3 \quad \text{(Eq. 4-2)}$$

$$p'(x,y)=(p(x,y+1)-p(x,y-1)+p(x,y)) \quad \text{(Eq. 4-3)}$$

$$p'(x,y)=(p(x-1,y)+p(x-1,y-1)+p(x-1,y+1)+p(x,y-1)+p(x,y+1)+p(x+1,y-1)+p(x+1,y)+p(x+1,y+1)+8*p(x,y))>>4 \quad \text{(Eq. 4-4)}$$

$$p'(x,y)=(w_1*p(x-1,y)+w_2*p(x-1,y-1)+w_3*p(x-1,y+1)+w_4*p(x,y-1)+w_5*p(x,y+1)+w_6*p(x+1,y-1)+w_7*p(x+1,y)+w_8*p(x+1,y+1)+w_9*p(x,y))/(\Sigma_{i=1}^{9}w_i) \quad \text{(Eq. 4-5)}$$

The filtered pixels in a $1^{st}$ reference line can be computed from Eq. 4-6~Eq. 4-10.

$$p'(x,y)=(p(x-1,y)+p(x,y-1)+p(x+1,y)+5*p(x,y))>>3 \quad \text{(Eq. 4-6)}$$

$$p'(x,y)=(p(x-1,y)+p(x,y-1)+p(x+1,y)+p(x,y))>>2 \quad \text{(Eq. 4-7)}$$

$$p'(x,y)=(2p(x,y)-p(x,y-1)) \quad \text{(Eq. 4-8)}$$

$$p'(x,y)=(p(x-1,y)+p(x-1,y-1)+p(x,y-1)+p(x+1,y-1)+p(x+1,y)+3*p(x,y))>>3 \quad \text{(Eq. 4-9)}$$

$$p'(x,y)=(w_1*p(x-1,y)+w_2*p(x-1,y-1)+w_3*p(x,y-1)+w_4*p(x+1,y-1)+w_5*p(x+1,y)+w_6*p(x,y))/(\Sigma_{i=1}^{6}w_i) \quad \text{(Eq. 4-10)}$$

The filtered pixels in a $4^{th}$ reference line can be computed from Eq. 4-11~Eq.4-15.

$$p'(x,y)=(p(x-1,y)+p(x,y+1)+p(x+1,y)+5*p(x,y))>>3 \quad \text{(Eq. 4-11)}$$

$$p'(x,y)=(p(x-1,y)+p(x,y+1)+p(x+1,y)+p(x,y))>>2 \quad \text{(Eq. 4-12)}$$

$$p'(x,y)=(2p(x,y)-p(x,y+1)) \quad \text{(Eq. 4-13)}$$

$$p'(x,y)=(p(x-1,y)+p(x-1,y+1)+p(x,y+1)+p(x+1,y+1)+p(x+1,y)+3*p(x,y))>>3 \quad \text{(Eq. 4-14)}$$

$$p'(x,y)=(w_1*p(x-1,y)+w_2*p(x-1,y+1)+w_3*p(x,y+1)+w_4*p(x+1,y+1)+w_5*p(x+1,y)+w_6*p(x,y))/(\Sigma_{i=1}^{6}w_i) \quad \text{(Eq. 4-15)}$$

In addition, rounding, such as rounding to zero, to positive infinity or to negative infinity, may be added to the above calculations.

Figure 13:
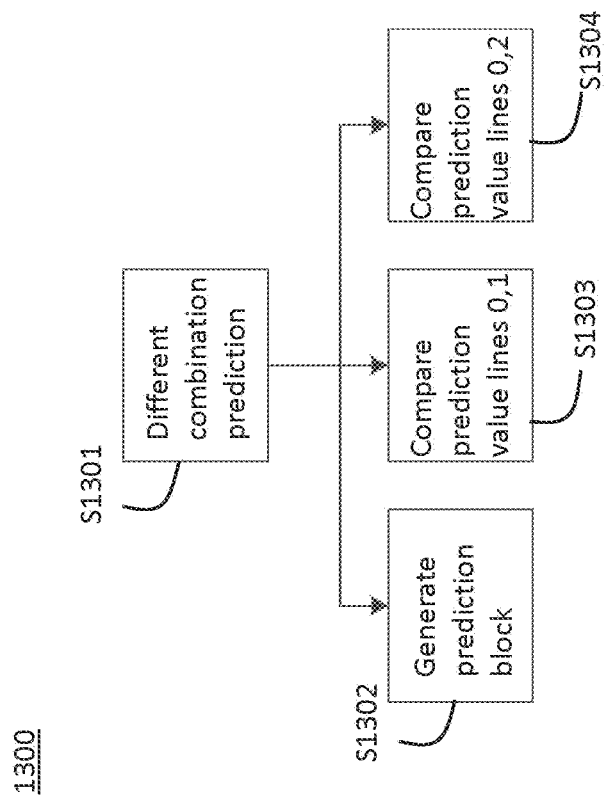

FIG. 13 illustrates a flowchart 1300 according to exemplary embodiments.

At S1301, in current block, samples in different position may use different combinations of reference samples with a different line index prediction. Here, the index of the closest reference line is denoted as 1.

At S1302, for a given intra prediction mode, each reference line i can generate one prediction block $Pred_i$. For the pixels in each position, that mode can use different combination of these generated prediction block $Pred_i$ to generate the final prediction block. To be specific, for the pixel at position (x,y), Eq. 4-16 can be used to calculate the prediction value $$\text{Pred}'(x,y)=\Sigma_{i=0}^{N}W_i\text{Pred}_i(x,y) \quad \text{(Eq. 4-16)}$$

where $W_i$ is position dependent. In other words, the weighting factors are the same for the same position, and the weighting factors are different for the different positions.

Alternatively, given an intra prediction mode, for each sample, a set of reference samples from multiple reference lines are selected, and a weighted sum of these selected set of reference samples is calculated as the final prediction value. The selection of reference samples may depend on intra mode and position of prediction sample, and the weightings may depend on intra mode and position of prediction sample.

At S1303, when applying reference line x for intra prediction, for each sample, the prediction value of line 0 and line x is compared, and if line 1 generates a very different prediction value, then the prediction value from line x is excluded, and line 0 may be used instead. The way to measure the difference between prediction value of current position and that of its neighboring positions includes, but is not limited to, gradient, SATD, SAD, MSE, SNR and PSNR.

Alternatively, more than two prediction values are generated from different reference lines, and the median (or average, or most frequently appeared) value is used as the prediction sample.

At S1304, when applying reference line x for intra prediction, for each sample, the prediction value of line 1 and line x is compared, and if line 1 generates a very different prediction value, then the prediction value from line x is excluded, and line 1 may be used instead. The way to measure the difference between prediction value of current position and that of its neighboring positions includes, but is not limited to gradient, SATD, SAD, MSE, SNR and PSNR.

Alternatively, more than two prediction values are generated from different reference lines, and the median (or average, or most frequently appeared) value is used as the prediction sample.

Figure 14:
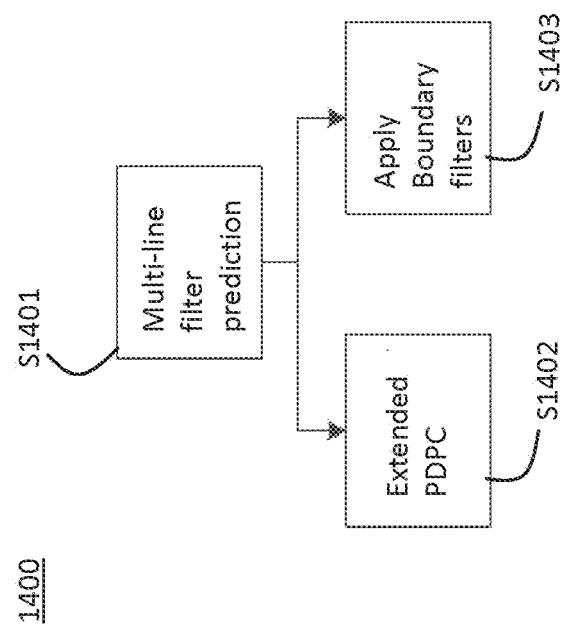

FIG. 14 illustrates a flowchart 1400 according to exemplary embodiments.

At S1401, after intra prediction, instead of only using the pixels in the nearest reference line, the pixels in multiple lines are used to filter the prediction value of each block. Here, the index of the closest reference line is denoted as 1.

For example, at S1402, PDPC may be extended for multiple line intra prediction. Each prediction sample pred [x][y] located at (x, y) is calculated as follows:

$$\text{pred}[x][y]=(\Sigma_{i=m}^{-1}wL_i*R_{i,y}+\Sigma_{i=m}^{-1}wT_i*R_{x,i}+\Sigma_{i=m}^{-1}wTL_i*TL_{i,i}+(64-\Sigma_{i=m}^{-1}wL_i-\Sigma_{i=m}^{-1}wT_i-\Sigma_{i=m}^{-1}wTL_i)*\text{pred}[x][y]+32)>>6 \quad \text{(Eq. 4-17)}$$

where m can be −8~−2.

In one example, reference samples in the nearest two lines are used to filter the samples in current block. For top-left pixel, only the top-left sample in the first row are used. It can be formulated by Eq. 4-18.

$$\text{pred}[x][y]=(\Sigma_{i=-2}^{-1}wL_i*R_{i,y}+\Sigma_{i=-2}^{-1}wT_i*R_{x,i}+wTL_{-1}*TL_{-1,-1}+(64-\Sigma_{i=-2}^{-1}wL_i-\Sigma_{i=-2}^{-2}wT_i-wTL_{-1})*\text{pred}[x][y]+32)>>6 \quad \text{(Eq. 4-18)}$$

Alternatively, at S1403, boundary filters can be extended to multiple lines.

After DC prediction, for the pixels in the first several columns and the first several rows are filtered by the neighboring reference pixels. The pixels in the first column can be filtered by $$p'(x,y)=(\Sigma_{i=m}^{-1}wL_i*R_{i,y}+(64-\Sigma_{i=m}^{-1}wL_i)*p(x,y))>>6 \quad \text{(Eq. 4-19)}$$

For the pixels in the first row, the filtering operation is as follows $$p'(x,y)=(\Sigma_{i=m}^{-1}wT_i*R_{x,i}+(64-\Sigma_{i=m}^{-1}wT_i)*p(x,y))>>6 \quad \text{(Eq. 4-20)}$$

In some special case, pixels in the first column can be filtered by $$p'(0,y)=p(0,y)+R_{-1,y}-R_{-2,y} \quad \text{(Eq. 4-21)}$$

Pixels in the first row can also be filtered by $$p'(x,0)=p(x,0)+R_{x,-1}-R_{x,-2} \quad \text{(Eq. 4-22)}$$

After a vertical prediction, the pixels in the first several columns can be filtered by Eq. 4-23

$$p'(x,y)=\Sigma_{=m}^{-1}wL_i*(R_{1,y}-R_{i,i})+p(x,y) \quad \text{(Eq. 4-23)}$$

After a horizontal prediction, the pixels in the first several rows can be filtered by Eq. 4-24

$$p'(x,y)=\Sigma_{i=m}^{-1}wT_i*(R_{x,i}-R_{i,i})+p(x,y) \quad \text{(Eq. 4-24)}$$

Figure 15:
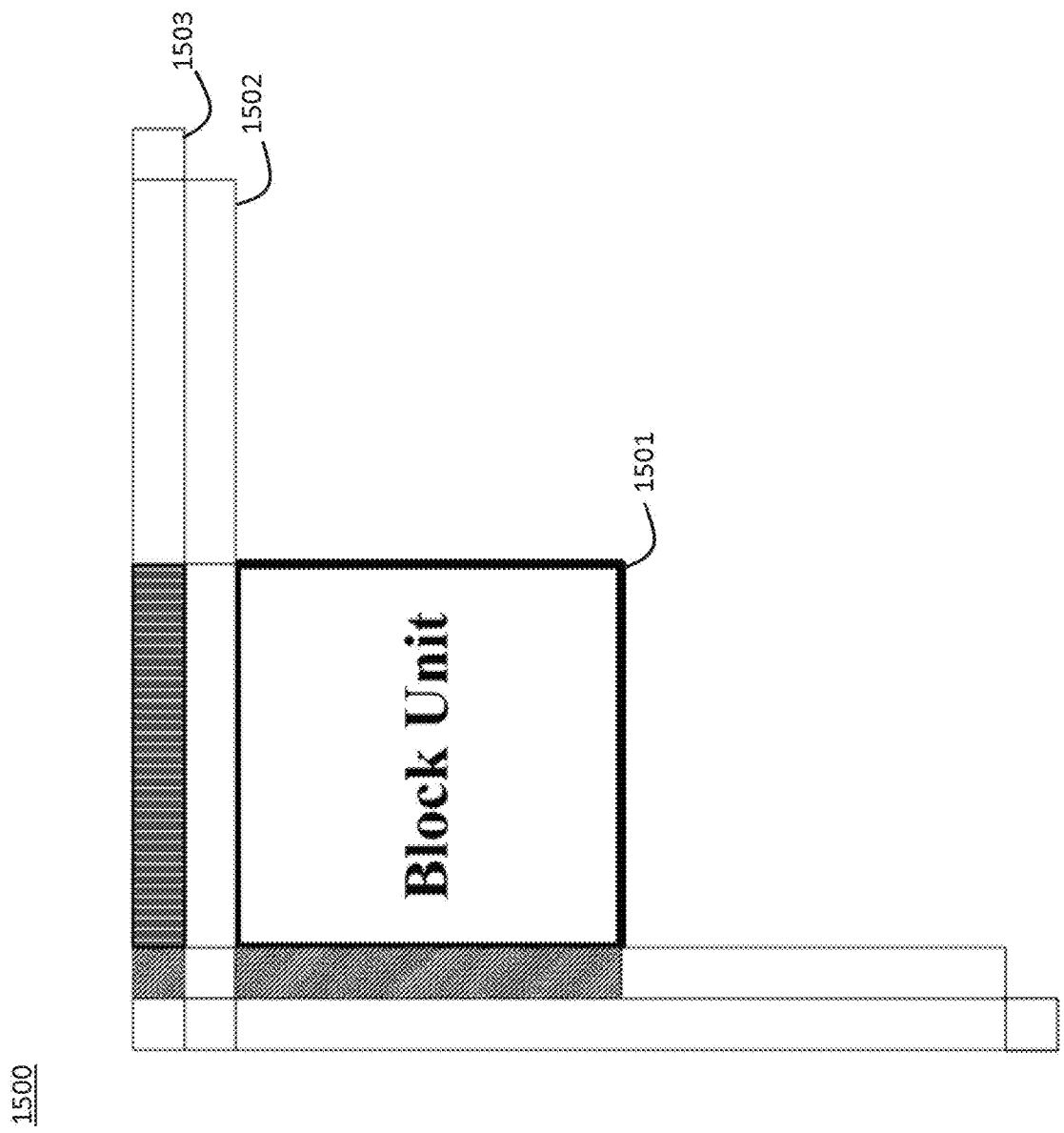
FIG. 15 is a schematic illustration of a diagram in accordance with embodiments.

In another embodiment, for vertical/horizontal prediction, if the reference line with an index larger than 1 is used to generate the prediction sample, the $1^{st}$ column/row and its corresponding pixel in the line index larger than 1 is used for boundary filtering. As illustrated in FIG. 15, with its reference lines 1503, 1502 and block unit 1501, $2^{nd}$ reference line 1503 is used to generate the prediction sample for a current block unit and the pixels with vertical direction are used for vertical prediction. After the vertical prediction, the pixels with a diagonal texture in reference line 1 and the pixel with diagonal texture in reference line 1503 are used to filter the first several columns in current block unit. The filtering process can be formulated by Eq. 4-25, where m denotes the selected line index, and it can be 2~8. n is the number of right shift bits, it can be 1~8.

$$p'(x,y)=p(x,y)+(p(-1,y)-p(-1,-m))>>n \quad \text{(Eq. 4-25)}$$

For horizontal prediction, the filtering process can be formulated by Eq. 4-26.

$$p'(x,y)=p(x,y)+(p(x,-1)-p(-m,-1))>>n \quad \text{(Eq. 4-26)}$$

In another embodiment, when reference line with index larger than 1 is used, after diagonal predictions, such as mode 2 and mode 34 in FIG. 1, pixels along the diagonal direction from the $1^{st}$ reference line to current reference line are used for filtering the pixels in the first several columns/rows of current block unit. To be specific, after mode 2 prediction, the pixels in the first several rows can be filtered by Eq. 4-27. After mode 34 prediction, the pixels in the first several columns can be filtered by Eq. 4-28. m denotes the reference line index for current block, and it can be 2~8. n is the number of right shift bits, it can be 2~8. $W_i$ is the weighting coefficients, and it is the integer.

$$p'(x,y)=(\Sigma_{i=1}^{m}W_iR(x+i,-i)+(2^n-\Sigma_{i=1}^{m}W_i)*p(x,y)+2^{n-1})>>n \quad \text{(Eq. 4-27)}$$

$$p'(x,y)=(\Sigma_{i=1}^{m}W_iR(-i,y+i)+(2^n-\Sigma_{i=1}^{m}W_i)*p(x,y)+2^{n-1})>>n \quad \text{(Eq. 4-28)}$$

Figure 16:
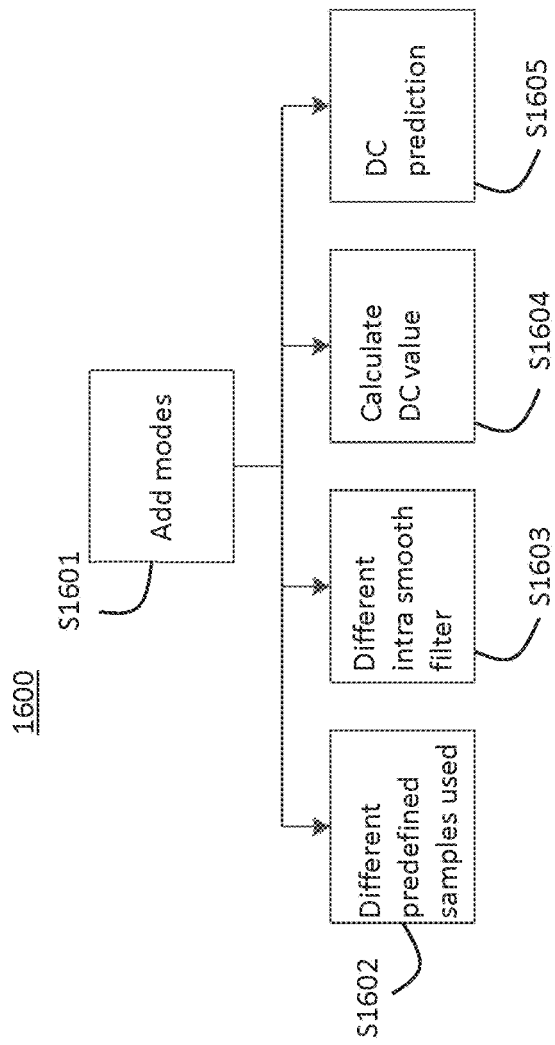
FIGS. 16-25 are simplified flow charts in accordance with embodiments.

FIG. 16 illustrates a flowchart 1600 according to exemplary embodiments.

At S1601, for multiple reference line intra prediction, modified DC and planar modes are added when a reference line index is greater than 1. Here, the index of the closest reference line is denoted as 1.

At S1602, for Planar mode, when a different reference line is used, different pre-defined top-right and bottom-left reference samples are used to generate the prediction samples.

At S1603, alternatively, when a different reference line is used, different intra smoothing filter is used.

At S1604, for DC mode, for $1^{st}$ reference line, all the pixels in the above row and the left column are used to calculate the DC value, when reference line index is greater 1, only some of the pixels are used to calculate the DC value.

For example, above pixels in a $1^{st}$ reference line are used to calculate the DC values for a $2^{nd}$ reference line, left pixels in a $1^{st}$ reference line are used to calculate the DC values for a $3^{rd}$ reference line, half of left pixels and half of the above pixels in a $1^{st}$ reference line are used to calculate the DC values for the $4^{th}$ reference line.

At S1605, for DC mode, all reference pixels in all available candidate lines (rows and columns) are used to calculate the DC predictor.

Figure 17:
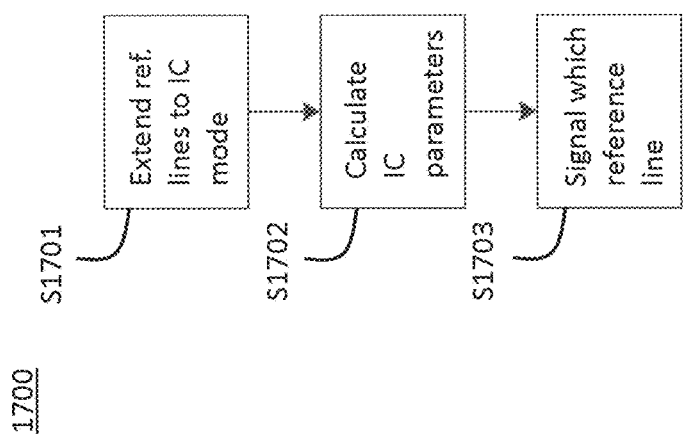

FIG. 17 illustrates a flowchart 1700 according to exemplary embodiments.

At S1701, it is implemented to extend multiple reference lines to IC mode. At S1702, multiple above/left reference lines are used to calculate IC parameters, and at S1703, which reference line is used to calculate IC parameters is signaled.

Figure 18:
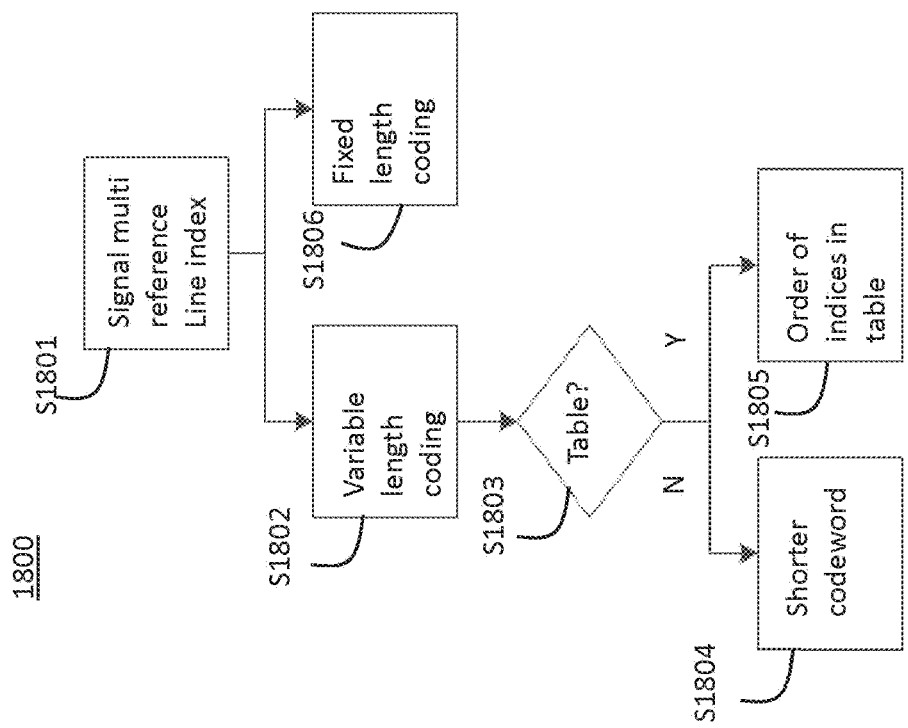

FIG. 18 illustrates a flowchart 1800 according to exemplary embodiments.

At S1801, it is implemented to signal multiple reference line index.

In one embodiment, at S1802, the reference line index is signaled using variable length coding. The closer to the current block in distance, the shorter the codeword. For example, if the reference line index is 0, 1, 2, 3, with 0 being closest to the current block and 3 the furthest, the codewords for them are 1, 01, 001, 000, where 0 and 1 can be alternated.

In another embodiment, at S1806, the reference line index is signaled using fixed length coding. For example, if the reference line index is 0, 1, 2, 3, with 0 being closest to the current block and 3 the furthest, the codewords for them are 10, 01, 11, 00, where 0 and 1 can be alternated and the order may be altered.

At S1803, it is considered whether to variously use a codeword table and if not, at S1804, in yet another embodiment, the reference line index is signaled using variable length coding, where the order of the indices in the codeword table (from the shortest codeword to the longest) is as follows: 0, 2, 4, . . . 2k, 1, 3, 5, . . . 2k+1 (or 2k−1). Index 0 indicates the reference line which is the closest to the current block and 2k+1, the furthest.

In yet another embodiment, at S1805, the reference line index is signaled using variable length coding, where the order of the indices in the codeword table (from the shortest codeword to the longest) is as follows: the closest, the furthest, $2^{nd}$ closest, $2^{nd}$ furthest, . . . and so on. In one specific example, if the reference line index is 0, 1, 2, 3, with 0 being the closest to the current block and 3 the furthest, the codewords for them are 0 for index 0, 10 for index 3, 110 for index 2, 111 for index 1. The codewords for reference line index 1 and 2 may be switched. The 0 and 1 in codewords may be altered.

Figure 19:
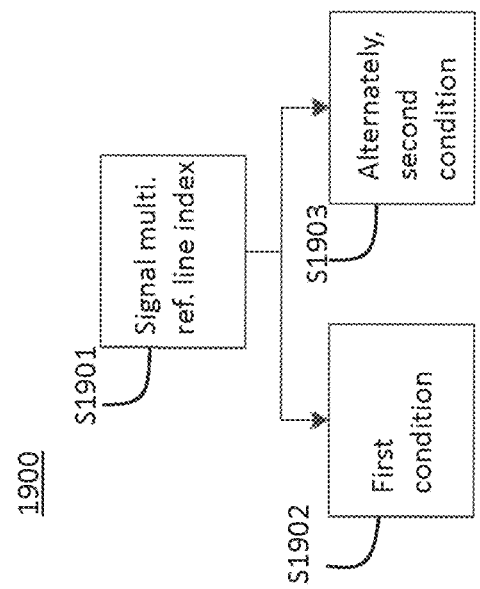

FIG. 19 illustrates a flowchart 1900 according to exemplary embodiments.

At S1901, there is signaling multiple reference line index when the number of above reference lines (rows) is different to the number of left reference lines (columns).

At S1902, in one embodiment, if the number of above reference lines (rows) is M and the number of left reference lines (columns) is N, then the reference line indices for max(M, N) may use any of the methods described above, or their combinations. The reference line indices for min(M, N) take a subset of the codewords from the codewords used for indicating reference line indices for max(M, N), usually the shorter ones. For example, if M=4, N=2, and the codewords used to signal M (4) reference line indices {0, 1, 2, 3} are 1, 01, 001, 000, then the codewords used to signal N (2) reference line indices {0, 1} are 1, 01.

In another embodiment, at S1903, if the number of above reference lines (rows) is M and the number of left reference lines (columns) is N, and if M and N are different, then the reference line indices for signaling above reference line (row) index and left reference line (column) index may be separate and independently use any method described above or their combinations.

Figure 20:
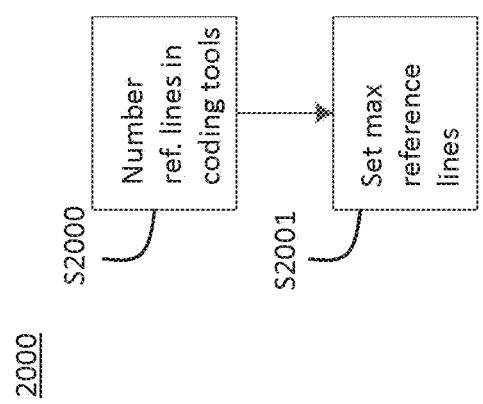

FIG. 20 illustrates a flowchart 2000 according to exemplary embodiments.

At S2000, it is considered to find number of reference lines in various coding tools, and at S2001, the maximum number of reference lines that may be used for intra prediction may be constrained to be no more than the number of reference lines used in other coding tools, such as a deblocking filter or a template matching based intra prediction, in order to potentially save the pixel line buffer.

Figure 21:
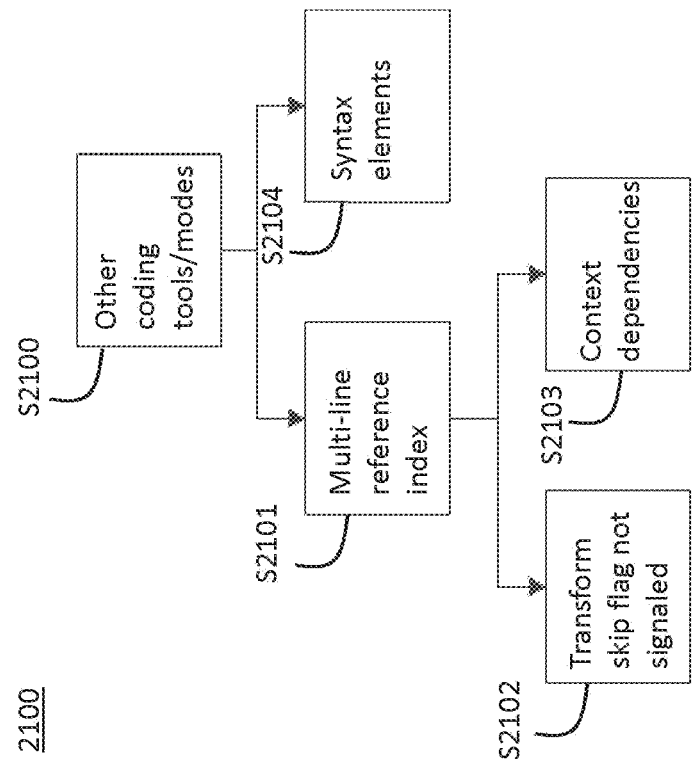

FIG. 21 illustrates a flowchart 2100 according to exemplary embodiments.

At S2100, interactions between multiple line intra prediction and other coding tools/modes are implemented.

For example, at S2101, in one embodiment, the usage and/or signaling of other syntax elements/coding tools/modes, including but not limited to: cbf, last position, transform skip, transform type, secondary transform index, primary transform index, PDPC index, may depend on the multi-line reference line index.

At S2102, in one example, when a multi-line reference index is nonzero, a transform skip is not used, and a transform skip flag is not signaled.

At S2103, in another example, the context used for signaling other coding tools, e.g., transform skip, cbf, primary transform index, secondary transform index, may depend on the value of multi-line reference index.

At S2104, in another embodiment, the multi-line reference index may be signaled after other syntax elements, including but not limited to: cbf, last position, transform skip, transform type, secondary transform index, primary transform index, PDPC index, and the usage and/or signaling of multi-line reference index may depend on other syntax elements.

Figure 22:
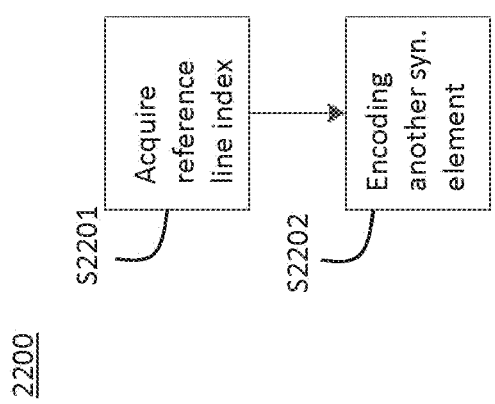

FIG. 22 illustrates a flowchart 2200 according to exemplary embodiments.

At S2201, it is considered to acquire a reference line index, and at S2202, the reference line index can be used as the context for entropy coding another syntax element, including, but not limited to intra prediction mode, MPM index, primary transform index, secondary transform index, transform skip flag, coding block flag (CBF) and transform coefficients, or vice versa.

Figure 23:
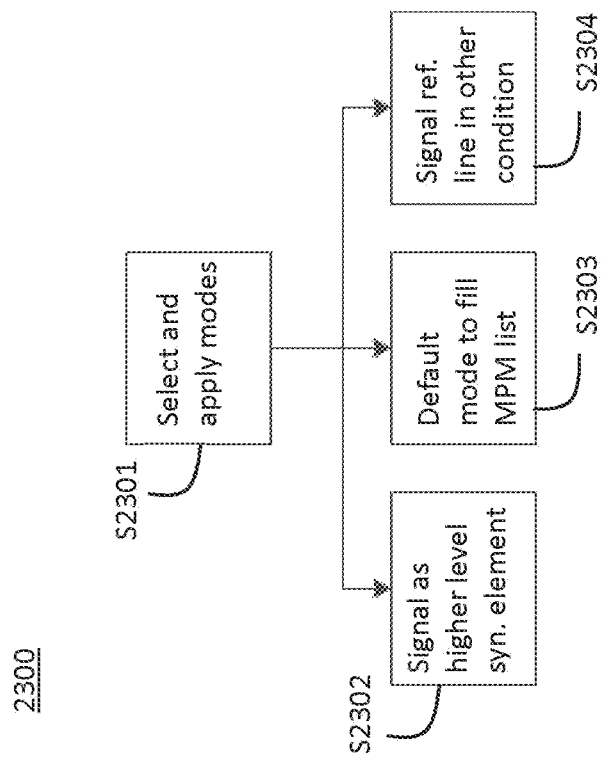

FIG. 23 illustrates a flowchart 2300 according to exemplary embodiments.

It is proposed that, at S2301, to include reference line information into the MPM list. That is to say, if the prediction mode of current block is the same as one candidate in MPM list, both of the intra prediction and the selected reference line of the selected candidate are applied for a current block, and the intra prediction mode and reference line index are not signaled. In addition, the number of the MPM candidates for different reference line indexes are predefined. Here, the closest reference line is denoted as 1.

At S2302, in one embodiment, the number of MPMs for each reference line index is predefined and it can be signaled as a higher level syntax element, such as in sequence parameter set (SPS), picture parameter set (PPS), slice header, Tile header, coding tree unit (CTU) header, or as a common syntax element or parameter for a region of a picture. As a result, the length of MPM list can be different in different sequences, pictures, slices, Tiles, group of coding blocks or a region of a picture.

For example, the number of MPMs for a reference line index 1 is 6, and the number of MPMs with each of other reference line indices is 2. As a result, if the total reference line number is 4, the total number of MPM list is 12.

Figure 24:
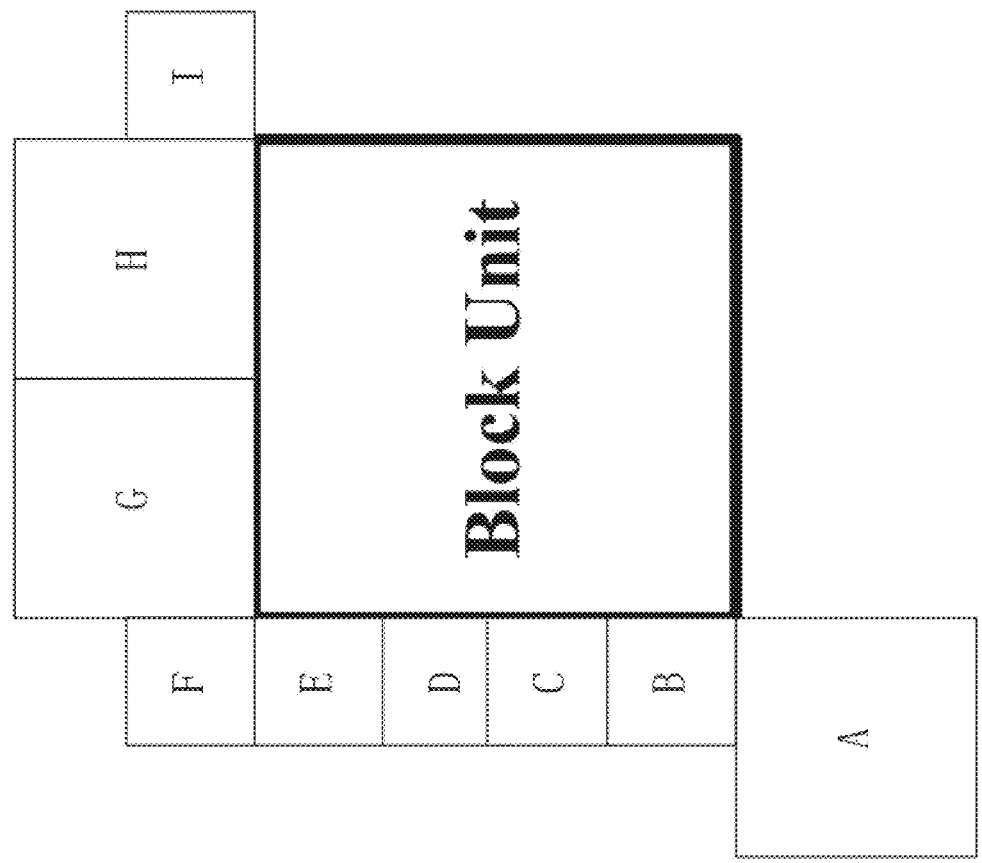

In another embodiment, at S2303, all intra prediction modes together with their reference line index in the above, left, top-left, to-right, and bottom-left block are included into the MPM list. As with the illustration 2400 in FIG. 24, showing all neighboring blocks of a current block unit and where A is bottom-left block, B, C, D, and E are left blocks, F is top-left block, G and H are top blocks, and I is top-right block. After adding modes of the neighboring blocks into MPM list. If the number of MPM candidate with given reference line number is less than the predefined number, default modes are used to fill the MPM list.

In another embodiment, at S2304, if the mode of current block is equal to one of the candidate in MPM list, the reference line index is not signaled. If the mode of current block is not equal to any candidate in MPM list, reference line index is signaled.

In one example, if line 1 is used for current block, second level MPM modes are still used, but a second level MPM only includes the intra prediction mode information.

In another example, for other lines, a second level MPM is not used, and a fixed length coding is used to code the remaining mode.

Figure 25:
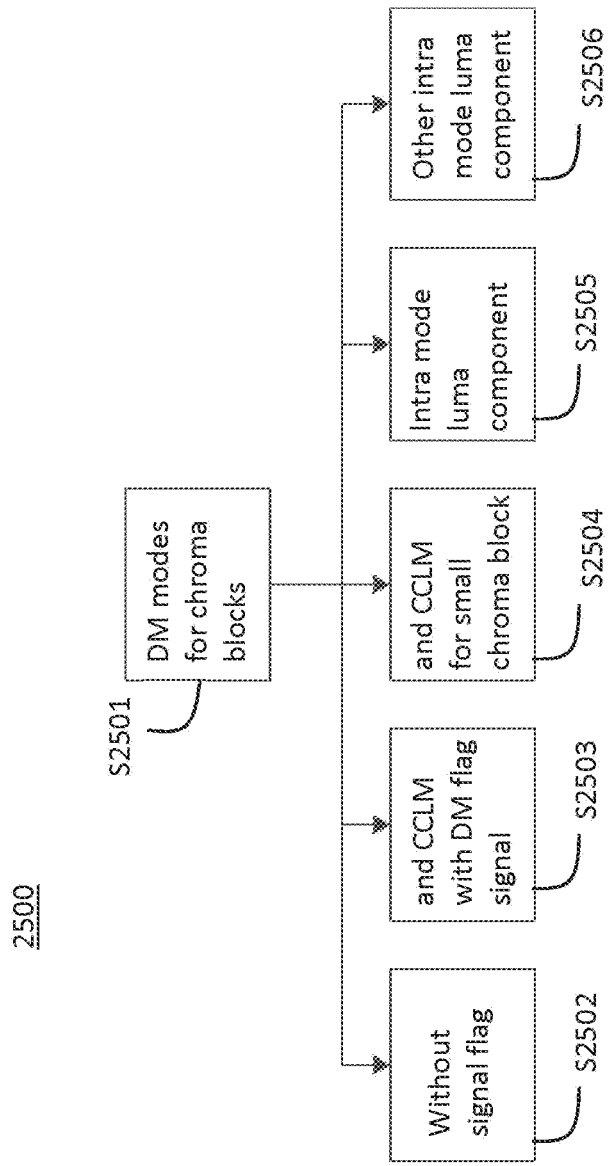

FIG. 25 illustrates a flowchart 2500 according to exemplary embodiments.

At S2501, in current VVC test mode VTM-1.0, chroma intra coding modes are the same as those in HEVC, including DM (direct copy of luma mode) and 4 additional angular intra prediction modes, in current BMS-1.0, the cross component linear model (CCLM) mode is also applied for chroma intra coding. The CCLM modes include one LM mode, one multi-model LM (MMLM) and 4 multi-filter LM (MFLM) modes, and it is in that light that only DM modes are used for chroma blocks when CCLM modes are not enabled whereas only DM and CCLM modes are used for chroma blocks when CCLM modes are enabled.

At S2502, in one embodiment, only one DM mode is used for chroma blocks and no flag is signaled for chroma blocks, the chroma mode is derived as DM mode.

In another embodiment, at S2503, only a one DM and one CCLM mode is used for chroma blocks and one DM flag is used to signal whether a DM or a LM mode is used for current chroma blocks.

In one sub-embodiment, there are 3 contexts used for signaling the DM flag. When both left and above blocks use DM modes, a context 0 is used to signal the DM flag. When only one of the left and above blocks uses DM modes, a context 1 is used to signal the DM flag. Otherwise, when both left and above blocks do not use DM modes, contexts 2 are used to signal a DM flag.

In another embodiment, at S2504 only DM and CCLM (when enabled) modes are used for small chroma blocks. When width, or height, or area size (width*height) of the chroma block is less than or equal to Th, current chroma block is called small chroma block. Th can be 2, 4, 8, 16, 32, 64, 128, 256, 512, or 1024.

For example, when the area size of a current chroma block is less than or equal to 8, only DM and CCLM (when enabled) modes are used for current chroma block.

In another example, when the area size of current chroma block is less than or equal to 16, only DM and CCLM (when enabled) modes are used for current chroma block.

In another example, only one DM and one CCLM (when enabled) modes are used for small chroma block.

In another embodiment, at S2505, when the intra mode of luma component is equal to one of the MPM mode, chroma blocks can only use DM mode and no flag is signaled for chroma mode, otherwise both DM and CCLM modes are allowed for chroma blocks.

In one example, a MPM mode can only be a first level MPM.

In another example, a MPM mode can only be the second level MPM.

In another example, a MPM mode can be either a first level MPM or a second level MPM.

In another embodiment, at S2506, when an intra mode of a luma component is not equal to any of the MPM mode, chroma blocks can use a DM mode and no flag is signaled for a chroma mode, otherwise both DM and CCLM modes are allowed for chroma blocks.

Accordingly, by exemplary embodiments described herein, the technical problems noted above may be advantageously improved upon by these technical solutions.

The techniques described above, can be implemented as computer software using computer-readable instructions and physically stored in one or more computer-readable media or by a specifically configured one or more hardware processors. For example, FIG. 26 shows a computer system 2600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 26:
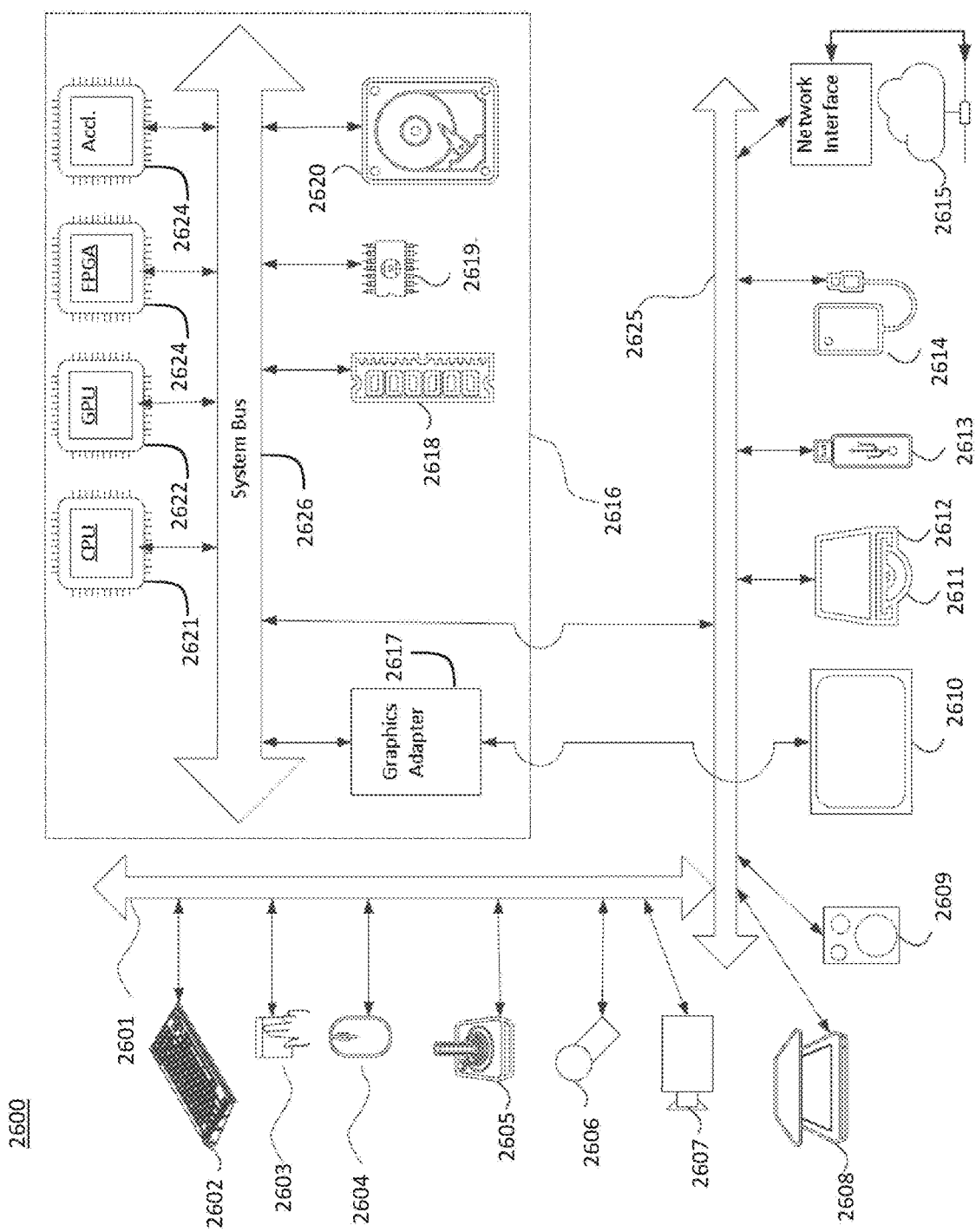
FIG. 26 is a schematic illustration of a diagram in accordance with embodiments.

The components shown in FIG. 26 for computer system 2600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 2600.

Computer system 2600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 2602, mouse 2603, trackpad 403, touch screen 2604, joystick 2605, microphone 2606, scanner 2608, camera 2607.

Computer system 2600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 2610, or joystick 2605, but there can also be tactile feedback devices that do not serve as input devices), audio output devices (such as: speakers 2609, headphones (not depicted)), visual output devices (such as screens 2610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 2600 can also include human accessible storage devices and their associated media such as optical media including CD/DVD ROM/RW 2612 with CD/DVD or the like media 2611, thumb-drive 2613, removable hard drive or solid state drive 2614, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 2600 can also include interface to one or more communication networks 2615. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general-purpose data ports or peripheral buses 2625 (such as, for example USB ports of the computer system 2600; others are commonly integrated into the core of the computer system 2600 by attachment to a system bus as described below (for example Ethernet interface into a PC computer system or cellular network interface into a smartphone computer system). Using any of these networks, computer system 2600 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 2612 of the computer system 2600.

The core 2612 can include one or more Central Processing Units (CPU) 2612, Graphics Processing Units (GPU) 2622, specialized programmable processing units in the form of Field Programmable Gate Areas (FPGA) 2624, hardware accelerators for certain tasks 2624, and so forth. These devices, along with Read-only memory (ROM) 2619, Random-access memory 2618, internal mass storage such as internal non-user accessible hard drives, SSDs, and the like 447, may be connected through a system bus 2626. In some computer systems, the system bus 226 can be accessible in the form of one or more physical plugs to enable extensions by additional CPUs, GPU, and the like. The peripheral devices can be attached either directly to the core's system bus 2626, or through a peripheral bus 2601. Architectures for a peripheral bus include PCI, USB, and the like.

CPUs 2621, GPUs 2622, FPGAs 2624, and accelerators 2624 can execute certain instructions that, in combination, can make up the aforementioned computer code. That computer code can be stored in ROM 2619 or RAM 2618. Transitional data can also be stored in RAM 2618, whereas permanent data can be stored for example, in the internal mass storage 2620. Fast storage and retrieve to any of the memory devices can be enabled through the use of cache memory, that can be closely associated with one or more CPU 2621, GPU 2622, mass storage 2620, ROM 2619, RAM 2618, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 2600, and specifically the core 2616 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 2616 that are of non-transitory nature, such as core-internal mass storage 2620 or ROM 2619. The software implementing various embodiments of the present disclosure can be stored in such devices and executed by core 2616. A computer-readable medium can include one or more memory devices or chips, according to particular needs. The software can cause the core 2616 and specifically the processors therein (including CPU, GPU, FPGA, and the like) to execute particular processes or particular parts of particular processes described herein, including defining data structures stored in RAM 2618 and modifying such data structures according to the processes defined by the software. In addition or as an alternative, the computer system can provide functionality as a result of logic hardwired or otherwise embodied in a circuit (for example: accelerator 2624), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding performed by at least one processor, the method comprising:
    performing decoding of a video sequence by intra prediction among a plurality of reference lines of the video sequence;
    setting a plurality of intra prediction modes for a zero reference line nearest to a current block of the intra prediction among a plurality of non-zero reference lines;
    setting one or more most probable modes for one of the non-zero reference lines;
    setting a length of a most probable mode list based on a reference line index value such that the length of the most probable mode list comprises a number of the one or more most probable modes;
    setting, in response to detecting the one of the non-zero reference lines, the length of the most probable mode list to 5; and
    setting, in response to determining that a current reference line is a zero reference line, the length of the most probable mode list to 6,
    wherein the one or more most probable modes are included in the most probable mode list, and
    wherein a planar mode and a DC mode are absent from the most probable mode list.

2. The method according to claim 1, further comprising:
    signaling a reference line index before signaling a most probable mode flag and an intra mode;
    signaling the most probable mode flag, in response to determining that the reference line index is signaled and that a signaled index indicates the zero reference line; and
    in response to determining that the reference line index is signaled and that a signaled index indicates at least one of the non-zero reference lines, deriving the most probable mode flag to be true, without signaling the most probable mode flag, and signaling a most probable mode index of the current block.

3. The method according to claim 1,
    wherein the one or more most probable modes are included in the most probable mode list.

4. The method according to claim 3, wherein a planar mode is absent from the most probable mode list.

5. The method according to claim 4, wherein a DC mode is absent from the most probable mode list.

6. The method according to claim 1, further comprising:
    setting, in response to detecting the non-zero reference line, the length of the most probable mode list to consist of five most probable modes.

7. The method according to claim 1, wherein the one of the non-zero reference lines is a neighboring line to the current block and is further away from the current block than the zero reference line.

8. The method according to claim 1, wherein the one or more most probable modes consist of a first level most probable mode.

9. The method according to claim 1, wherein the one or more most probable modes comprise any level of most probable mode from a lowest level most probable mode to a highest level most probable mode.

10. The method according to claim 1, wherein the one or more most probable modes comprise only levels of the most probable modes allowed for the non-zero reference line.

11. An apparatus comprising:
at least one memory configured to store computer program code;
at least one hardware processor configured to access the computer program code and operate as instructed by the computer program code, the computer program code including:
decoding code configured to cause the processor to decode a video sequence by performing intra prediction among a plurality of reference lines of the video sequence;
intra prediction mode code configured to cause the at least one processor to set a plurality of intra prediction modes for a zero reference line nearest to a current block of the intra prediction among a plurality of non-zero reference lines; and
most probable mode code configured to cause the at least one processor to set one or more most probable modes for one of the non-zero reference lines,
wherein the most probable mode code is further configured to cause the at least one processor to set a length of the most probable mode list based on a reference line index value such that the length of the most probable mode list comprises a number of the one or more most probable modes,
wherein the most probable mode code is further configured to cause the at least one processor to set, in response to detecting the non-zero reference line, the length of the most probable mode list to 5, and
wherein the most probable mode code is further configured to cause the at least one processor to set, in response to determining that a current reference line is a zero reference line, the length of the most probable mode list to 6.

12. The apparatus according to claim 11, wherein the program code further includes signaling code configured to cause the at least one processor to:
signal a reference line index before signaling a most probable mode flag and an intra mode;
the most probable mode flag is signaled in response to determining that the reference line index is signaled and that a signaled index indicates the zero reference line; and
in response to determining that the reference line index is signaled and that a signaled index indicates at least one of the non-zero reference lines, derive the most probable mode flag to be true, without signaling the most probable mode flag, and signal a most probable mode index of the current block.

13. The apparatus according to claim 11,
wherein the one or more most probable modes are included in the most probable mode list.

14. The apparatus according to claim 13, wherein a planar mode is absent from the most probable mode list.

15. The apparatus according to claim 14, wherein a DC mode is absent from the most probable mode list.

16. The apparatus according to claim 11, wherein the most probable mode code is further configured to cause the at least one processor to:
set, in response to detecting the non-zero reference line, the length of the most probable mode list to consist of five most probable modes.

17. The apparatus according to claim 11, wherein the one of the non-zero reference lines is a neighboring line to the current block and is further away from the current block than the zero reference line.

18. The apparatus according to claim 11, wherein the one or more most probable modes consist of a first level most probable mode.

19. The apparatus according to claim 11, wherein the one or more most probable modes comprise any level of most probable mode from a lowest level most probable mode to a highest level most probable mode.

20. A non-transitory computer readable medium storing a program causing a computer to execute a process, the process comprising:
performing decoding of a video sequence by intra prediction among a plurality of reference lines of the video sequence;
setting a plurality of intra prediction modes for a zero reference line nearest to a current block of the intra prediction among a plurality of non-zero reference lines;
setting one or more most probable modes for one of the non-zero reference lines;
setting a length of a most probable mode list based on a reference line index value such that the length of the most probable mode list comprises a number of the one or more most probable modes;
setting, in response to detecting the one of the non-zero reference lines, the length of the most probable mode list to 5; and
setting, in response to determining that a current reference line is a zero reference line, the length of the most probable mode list to 6.

* * * * *